United States Patent [19]

Sato et al.

[11] 4,050,371
[45] Sept. 27, 1977

[54] FRUIT TREATING APPARATUS

[75] Inventors: Yasuhiro Sato, Sendai; Toshio Sato, Izumi; Shuichi Kawasaki, Kawasaki; Toshio Takaishi, Izumi; Sadao Okuyama, Sendai; Norio Yamanashi, Shimizu, all of Japan

[73] Assignee: Toyo Seikan Kaisha Ltd., Tokyo, Japan

[21] Appl. No.: 618,123

[22] Filed: Sept. 30, 1975

Related U.S. Application Data

[62] Division of Ser. No. 485,556, July 3, 1974, Pat. No. 4,013,001.

[30] Foreign Application Priority Data

July 5, 1973 Japan .................................. 48-79887
July 6, 1973 Japan .................................. 48-80349

[51] Int. Cl.² .......................... A23N 4/12; A23N 4/22
[52] U.S. Cl. ......................................... 99/550; 99/553
[58] Field of Search ............................... 99/547–564; 302/14; 61/14; 198/29–30

[56] References Cited

U.S. PATENT DOCUMENTS

| 2,360,411 | 10/1944 | Frova | 99/547 |
| 2,824,665 | 2/1958 | Lamouria | 302/14 |
| 3,277,940 | 10/1966 | Henderson | 99/549 |
| 3,288,265 | 11/1966 | Smith | 302/14 |
| 3,499,519 | 3/1970 | Belk | 198/30 |
| 3,695,322 | 10/1972 | Anderson | 99/547 |
| 3,788,459 | 1/1974 | Holm | 198/218 |

Primary Examiner—Harvey C. Hornsby
Assistant Examiner—Robert Pous
Attorney, Agent, or Firm—Toren, McGeady and Stanger

[57] ABSTRACT

In the case, where fruits, which are relatively soft and liable to be bruised upon contact or collision with another object such as particularly in the case of white peaches, are to be separated into flesh and pit automatically, apparatus for assuring a high efficiency and a high yield is provided for separating and taking out flesh from the fruits without brusing the flesh as much as possible.

5 Claims, 44 Drawing Figures

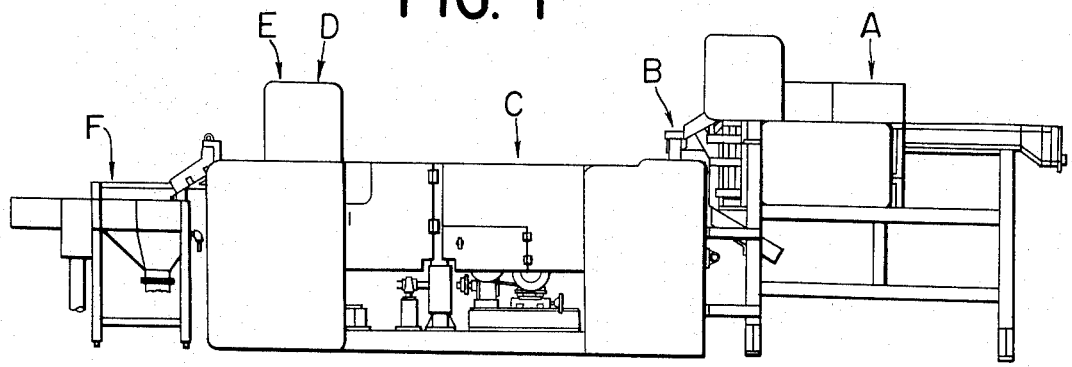
FIG. 1
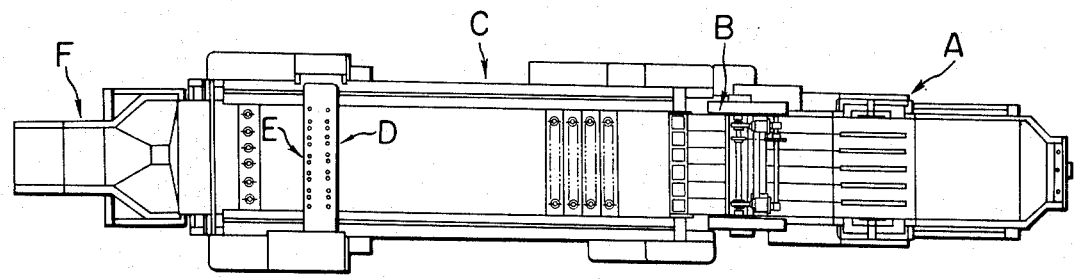
FIG. 2
FIG. 4
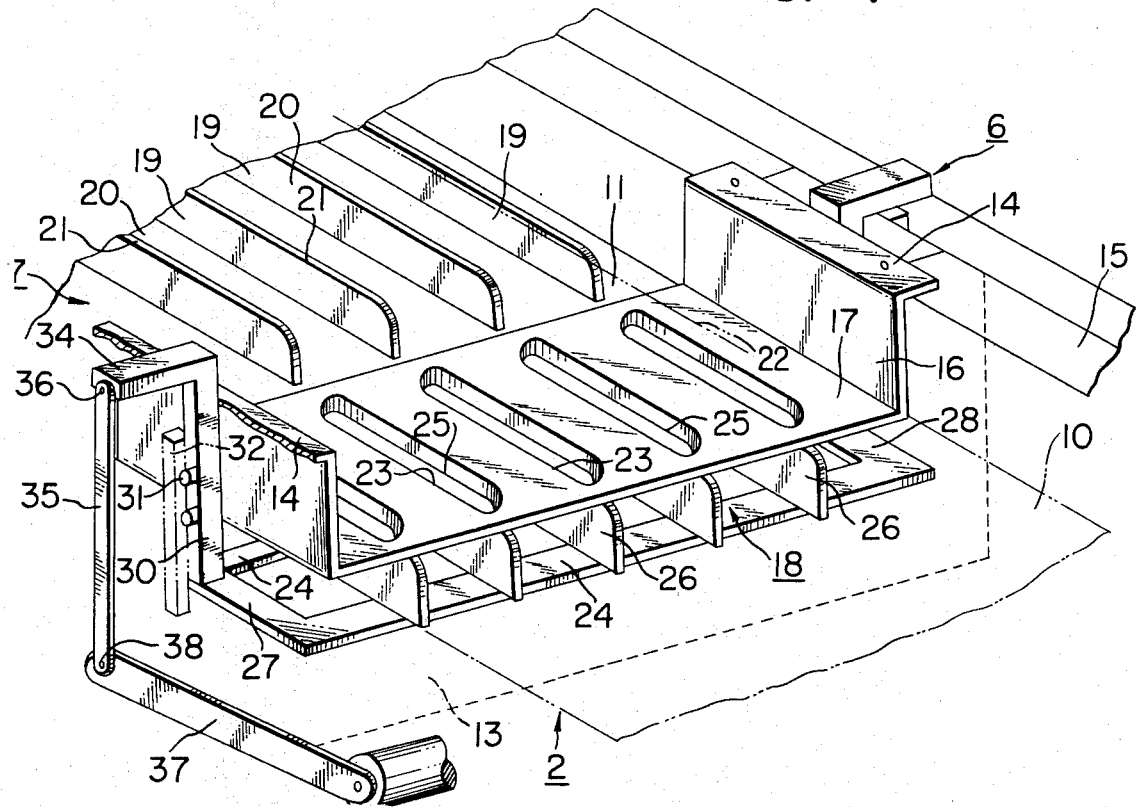

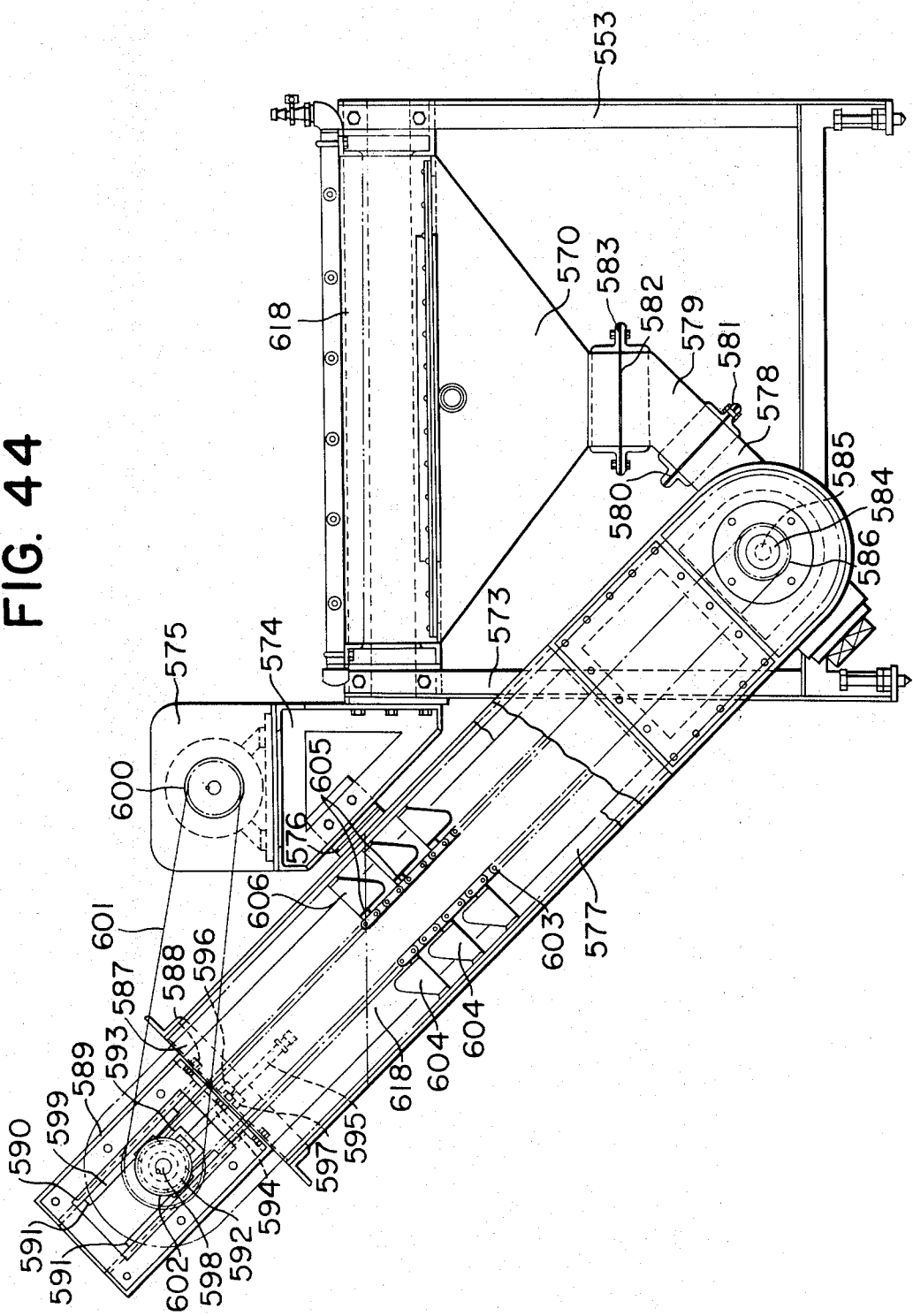

FRUIT TREATING APPARATUS

This is a Division of application Ser. No. 485,556 filed July 3, 1974, now U.S. Pat. No. 4,013,001.

BACKGROUND OF THE INVENTION:

In obtaining flesh for canning from a fruit having a pit at the center, the flesh is taken by removing the pit which is relatively large in general. If such an operation is carried out manually, many hands are required therefor, which leads to a low productivity and low efficiency, and which is uneconomical and lacking in sanitation.

To overcome such deficiencies, an apparatus is proposed which separates flesh and pit automatically and takes out the flesh. Such an apparatus for taking out flesh developed by the prior art supplies the fruits on a certain receiver, and performs the operation of orienting the axial line of the fruits in a predetermined direction while the fruits are transferred by moving the receiver intermittently. The operation of slivering the fruit positioned by the preceding operation is carried out by means of the upper and lower cutters and at the same time severing the flesh and the pit, and then the flesh and pits are placed on a vibrating and perforated plate, the pits which have small volume are sieved off, and the slivered flesh left on the perforated plate is removed.

However, in general, fruits are liable to be bruised, especially in the case of white peaches, which change the color at a spot by a merely being pressed and lose their merit as merchandise. Thus, such soft and bruisable fruits produce much faulty flesh when they are processed by a conventional flesh taking out device, leaving one to be content with a low yield and a low productivity.

The present invention relates to an apparatus for automatically separating and obtaining flesh of fruit with a high efficiency and a high yield, and more particularly, it relates to a fruit processing apparatus which can be used for producing excellent flesh from a soft and easily bruisable fruit such as white peaches with high efficiency and high yield. With the present apparatus, the productivity of the canning industry using fruits is much improved.

SUMMARY OF THE INVENTION

An object of the present invention is to provide a means for separating a fruit automatically into the flesh and the pit.

Another object of the present invention is to provide a means appropriate for automatically separating a fruit, which is relatively soft such as a white peach, into the flesh and pit.

Further object of the present invention is to provide a full automatic fruit processing apparatus for automatically separating fruit into flesh and pit, comprising a feeding mechanism supplying the fruits smoothly, a connecting mechanism for relaying and forwarding the fruits which have been delivered from said feeding mechanism to the following posture control mechanism, a posture control mechanism for orienting fruits delivered from said connecting mechanism so that the sature line of the fruit is directed in a predetermined direction after the stem indent portion of the fruit has been placed downwardly, a slivering mechanism slivering the fruit, controlled and delivered from the posture control mechanism, a pitting mechanism separating the pit of the fruit from the flesh which has been delivered, cut into two halves, from said slivering mechanism, and a separating and recovering mechanism for separating and recovering flesh and pit, which are not separated perfectly as yet, delivered from the pitting mechanism.

Still a further object of the present invention is to provide, in a fully automatic fruit processing apparatus for automatically separating a fruit into the flesh and pit and to obtain the flesh, a feeding mechanism which prevents the accumulation of the fruit in their feeding process, or formation of "bridging," or obstruction of their path with each other, so that the fruits can be supplied automatically in good order and with smoothness.

Another object of the present invention is to provide, in a fully-automatic fruit processing apparatus for automatically separating flesh and pit from the fruit and to obtain the flesh therefrom, a mechanism for stopping the fruit temporarily and for relaying the fruit, which have been delivered from said feeding mechanism, to the posture controlling mechanism.

Another object of the present invention is to provide, in a fruit processing apparatus for separating automatically the fruit into flesh and pit, means for controlling the posture of the fruit so that the fruit, which has been delivered from said connecting mechanism, is oriented such that the stem indent portion of the fruit is placed vertically downward in the receiver and that the sature line of the fruit is brought in parallel to the direction of the transfer of the fruit.

Another object of the present invention is to provide, in a full-automatic fruit processing apparatus for separating automatically the fruit into flesh and pit, a slivering mechanism which slivers the flesh portion of the fruit placed in the receiver vertically in two halves only at portions including an upper cutter and a lower cutter, but which is adapted not to cut the pit portion.

Still another object of the present invention is to provide, in a full-automatic fruit processing apparatus for separating automatically the fruit into flesh and pit, a pitting mechanism for separating a pit of fruit from the flesh, which has been placed in the receiver and slivered in two halves, this pitting mechanism being provided with an upper rotary cutter and a lower rotary cutter.

Still a further object of the present invention is to provide, in a fully-automatic fruit processing apparatus for separating automatically the fruit into flesh and pit, means for raising the inverted cup shaped fruit holder after said upper cutter has been raised up to a predetermined height, said fruit holder holding the shoulder portion of the fruit placed in the fruit receiver for maintaining the posture of fruit during slivering by means of said upper and lower pair of cutters after the flesh portion has been slivered leaving the pit portion by inserting a pair of cutters consisting of upper and lower cutter, whereby the flesh is not entrained by said upper cutter and bruised thereby.

Further object of the present invention is to provide, in said pitting mechanism in a fully-automatic fruit processing apparatus for separating automatically a fruit into flesh and pit to obtain the flesh, means for raising the fruit holder after said upper rotary cutter has been raised up to the predetermined height, said fruit holder holding the shoulder portion of the fruit which has been placed in the fruit receiver for maintaining the posture of the fruit when the upper rotary cutter is raised after the pit has been separated by rotation of the upper and lower cutters inserted between the slivered portion of the fruit, whereby the flesh is not entrained by said upper rotary cutter and not bruised thereby.

Still another object of the present invention is to provide, in a fully-automatic fruit processing apparatus for automatically separating a fruit into flesh and pit to obtain the flesh, a flesh-pit separating and recovering mechanism adapted for accommodating flesh and pits delivered from the receiver, which occurs after severing the pit from the flesh and, forwarding the pits to the pit recovering section, so as to forward the flesh alone to the succeeding process.

BRIEF DESCRIPTION OF THE DRAWINGS

FIG. 1 is a side elevation showing a general view of the fruit processing apparatus according to the present invention, FIG. 2 is a plan view thereof, FIG. 4 is a perspective view of the essential parts showing the details of the bridge preventing portion in the fruit feeding mechanism shown in FIG. 3, FIG. 44 is a sectional view of the pit recovering mechanism in said flesh-pit separating and recovering mechanism.

Figure 3:
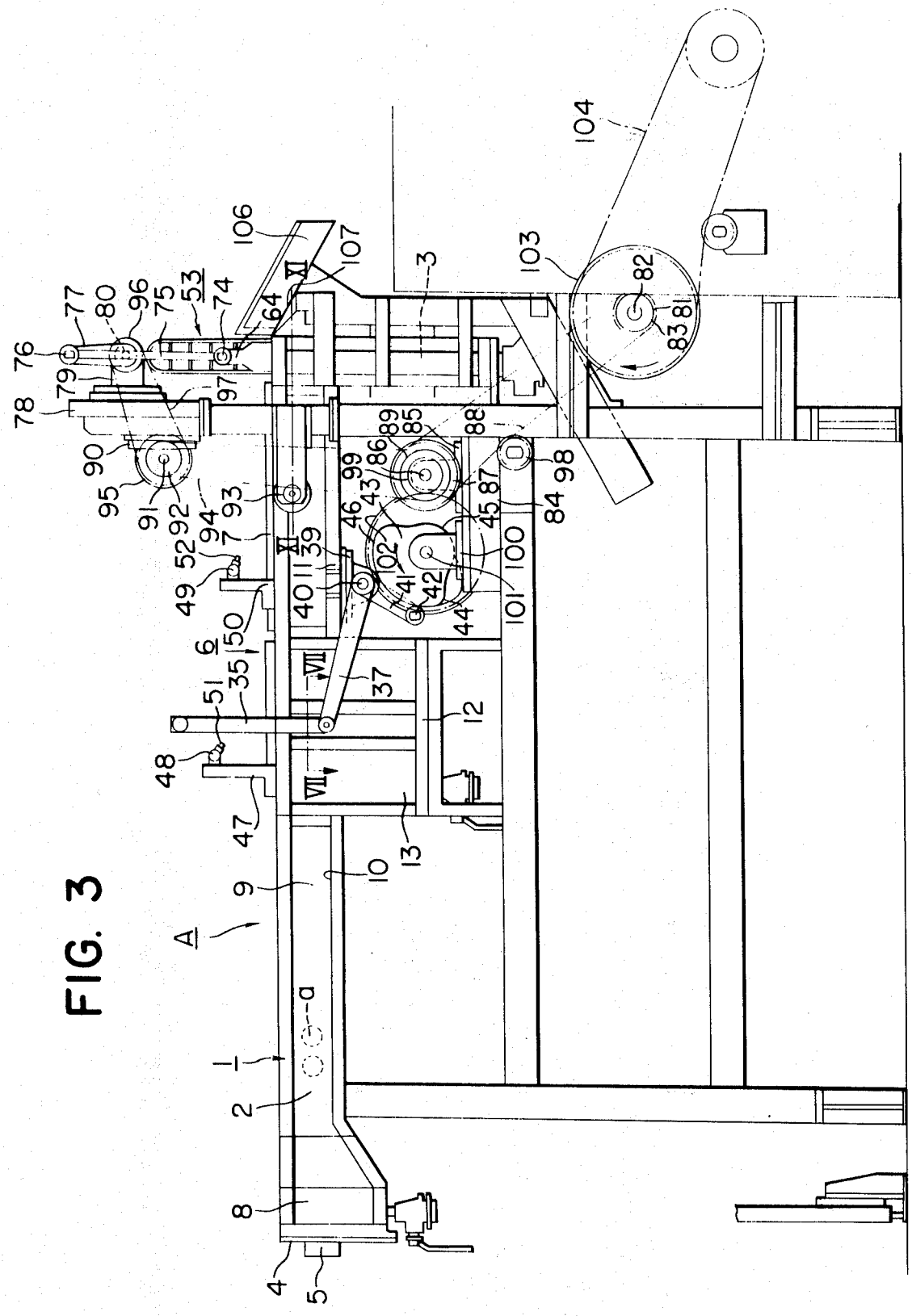
FIG. 3 is a side elevation showing the essential parts of the fruit feeding mechanism in the apparatus of the present invention for supplying fruits to be processed for feeding them systematically.

DETAILED DESCRIPTION OF THE INVENTION:

Referring to the drawings, an embodiment of the fruit treating apparatus according to the present invention will be explained hereinafter.

As shown in FIG. 1 and FIG. 2, the apparatus of the present invention comprises a fruit feeding mechanism (A), a connecting mechanism (B), a fruit posture control mechanism (C), a fruit slivering mechanism (D), a fruit pitting mechanism (E), and a fruit flesh-pit severing and recovering mechanism (F).

The apparatus of the invention can be operated so that fruits to be treated are filed by the fruit feeding mechanism (A) fed smoothly to the connecting mechanism (B), by which the fruits are respectively placed on cup-shaped receivers in the fruit posture control mechanism (C), and thus posture controlled so that the indents of fruits are oriented substantially in the vertically downward direction. The sature lines of fruits are oriented in a predetermined direction, and then the posture controlled fruits on the receivers are transferred into the fruit slivering mechanism (D) and slivered by means of the upper cutter and the lower cutter in said slivering mechanism. These slivered fruits on the receivers are fed into the fruit pitting mechanism (E) where each of them is cut between flesh and pit by means of the upper rotary cutter and the lower rotary cutter in said pitting mechanism. The thus treated fruits are transferred into the fruit flesh-pit severing and recovering mechanism (F), by which each of them is severed to flesh and pit.

The apparatus according to the present invention has such advantages that the treatment by which only the flesh are taken out by slivering fruits and severing pit therefrom can be automatically and mechanically done, and accordingly is extremely sanitary and efficient. The flesh obtained by the apparatus of the present invention is usually forwarded to the conventional fruit-skin removing apparatus.

The respective mechanisms in the apparatus of the present invention will be described in detail in the following.

FRUIT FEEDING MECHANISM (A)

Referring to FIG. 3 through FIG. 14, a water tank 1 has a fruit charging portion 2 at its one end and a subsided portion 3 at its other end. Water is continuously supplied into the water tank 1 from a water supply pipe 5 provided on the wall 4 of one end of said tank 1 for providing a water stream in the direction from one end to the other end of said tank 1. There are provided a bridge preventing portion 6 and a file transfer portion 7 between the fruit charging portion 2 and the subsibed portion 3, said bridge-preventing portion 6 being formed continuously to the fruit charging portion 2, and the file transfer portion 7 being formed continuously to the bridge preventing portion 6.

The bottom face of starting portion 8 in the fruit charging portion 2 is lower than the bottom face 10 of the fruit floating portion 9 in the fruit charging portion 2. The bottom face 11 of the file transfer portion 7 is on the same level as the bottom face 10, but the bottom face 12 of the bridge preventing portion 6 is lower than that of said bottom faces 10, 11, so that a concave portion 13 having the bottom face 12 is formed.

Figure 5:
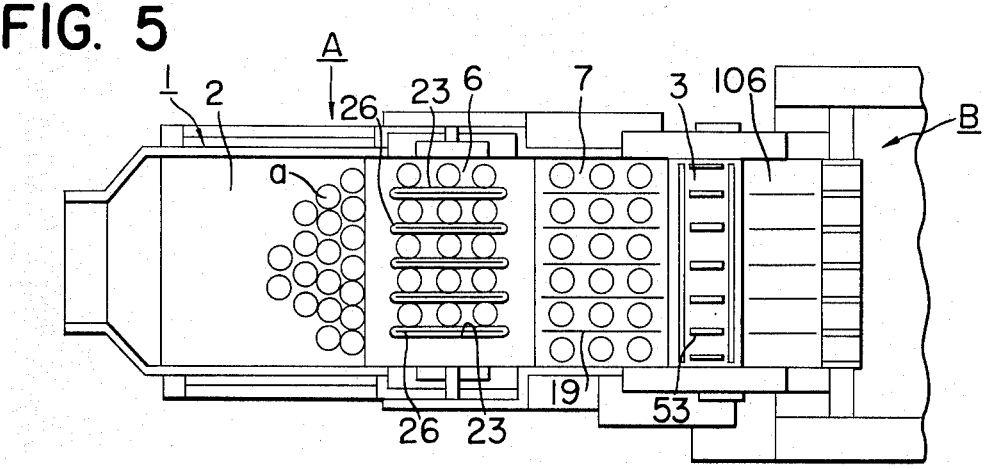
FIG. 5 is schematic plan view for explaining the transfer of fruits in the fruit feeding mechanism shown in FIG. 3.
Figure 6:
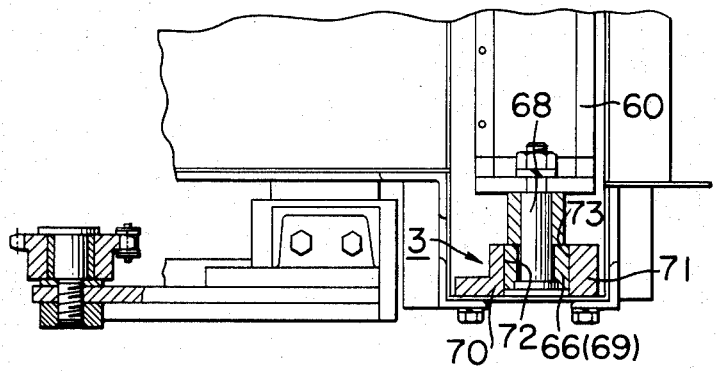
FIG. 6 is a sectional view along the line VI—VI in FIG. 3.
Figure 7:
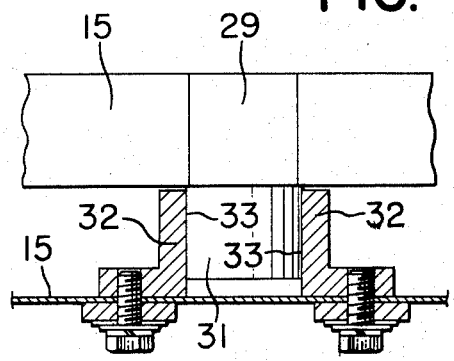
FIG. 7 is a sectional view along the line VII—VII in FIG. 3.
Figure 8:
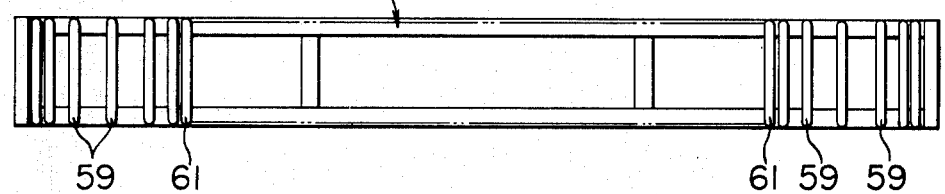
FIG. 8 is a plan view of the lifter in the fruit feeding mechanism shown in FIG. 3.

Referring to FIGS. 4 and 5, the bridge preventing portion 6 has an intermediate bottom 17 which can come as the same level to said bottom faces 10, 11, said intermediate bottom 17 being formed with an intermediate bottom forming element 16 on both sides of which bent portions 14 are fixed at the frame 15.

A horizontal frame body 18 which is movable up and down is provided in water below the intermediate bottom 17. A plurality of stationary partition walls 19 are provided on bottom face 11 of the file transfer portion 7 in parallel to the water stream, thereby to form separate waterways 20.

The upper edges 21 of the stationary partition walls 19 protrude from a predetermined water level 22 of the water tank 1 up to a required height.

Referring to FIG. 5, the intermediate bottom 17 of the bridge preventing portion 6 has slits 23 each of which is aligned with respect to each of said stationary partition walls 19 of the file transfer portion 7.

Movable partition walls 26 are mounted integrally with the horizontal frame body 18, each upper edge 25 of the walls 26 being on the same level. The rear end of the lower edge of said walls 26 are respectively fixed at the cross portions 24 of the horizontal frame body 18.

Movable partition walls 26 are designed so that they are moved upwardly together with the frame body 18 and pass through each of slits 23 of the intermediate bottom 17, the upper edge 25 of each of the walls 26 appearing slightly above the water level of the water tank 1 at the upper limit of the upward movement of the frame body 18, but not appearing over the intermediate bottom 17 at the lower limit of the downward movement of the frame body 18.

The frame body 18 is provided with post members 29 at the substantially central position of both side members 27, 28 of the frame body 18, and a pair of vertically arranged rollers 31 are rotatably mounted at the outside face of the vertical portion 30 of said post members 29, said rollers being rotatable on the opposing face 33 in a pair of guide elements 32 provided at the frame 15.

The end face of the upper bend portion 34 of the post member 29 has a pin 36 through which said end face of the upper bend portion 34 is pivotally connected to the upper end of a lever 35. The lower end of the lever 35 is pivotally connected to one end of a lever 37 through a pin 38. The other end of the lever 37 is fixed on a cross shaft 40 (see FIGS. 3 and 4) of which both ends are rotatably supported by bearings 39 fixed on the frame 15. The upper end of a short lever 41 is fixed on the cross shaft 40. A cam follower 42 pivotted at the lower end of the lever 41 is engaged with the cam face 44 of a cam 43. A bell crank-shaped body is formed by the lever 37 and the lever 41.

The cam 43 has a small diameter portion 45 and a large diameter portion 46. The movable partition walls 26 are held in its lower limit when the small diameter portion 45 is in contact with the cam follower 42, and the movable partition walls 26 are held in its upper limit when the large diameter portion 46 is in contact with the cam follower 42.

In this embodiment, the holding time of the movable partition walls 26 at its upper limit is set to be 7 seconds when the fruit is a peach, and the holding time at its lower limit is set to be 3 seconds. Above the water tank 1, a water supplying pipe 48 is provided by supporting brackets 47 fixed at the upper edge of the frame 15 in the bridge preventing portion 6. Another water supplying pipe 49 is provided by supporting brackets 50 fixed at the upper edge of the frame 15 in the file transfer portion 7. A plurality of water injection nozzles 51 are respectively mounted on the water supplying pipes 48, 49 and the injection ports 52 of said nozzles 51 are inclined downwardly toward the other or subsided end 3 of the water tank 1.

The water stream injected from the injection nozzles 51 serves as an assisting water stream when transferring fruits from the bridge preventing portion 6 to the file transfer portion 7 and likewise from the file transfer portion 7 to a lifter 53 provided on the subsided portion 3. Said lifter 53 is shown in FIGS. 3, 5, 6 through 13.

Figure 9:
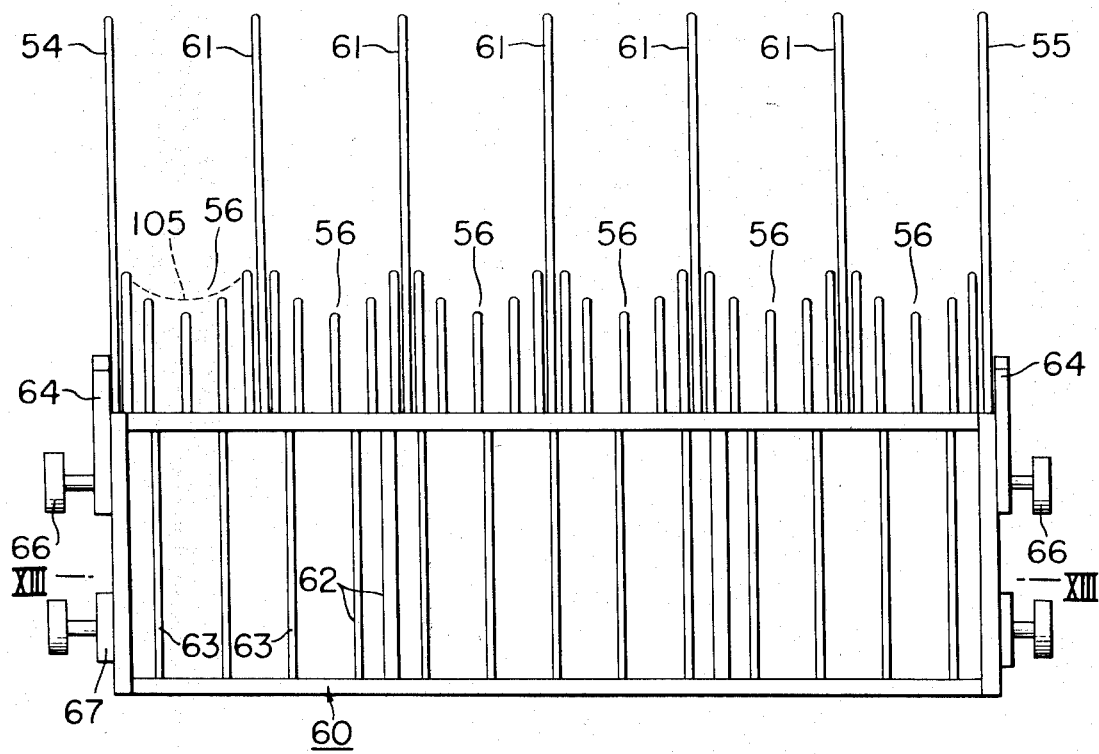
FIG. 9 is a front elevation of the lifter shown in FIG. 8.
Figure 10:
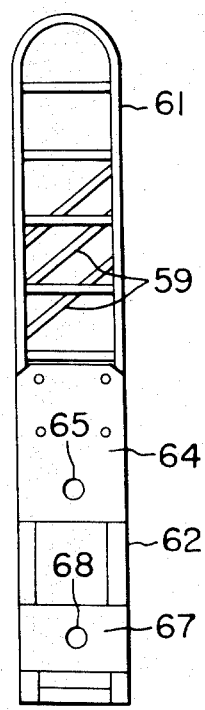
FIG. 10 is a side elevation of the same.
Figure 11:
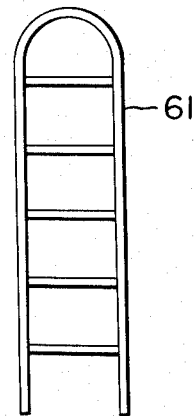
FIG. 11 is a side elevation of the ladder-shaped portion in the lifter.
Figure 12:
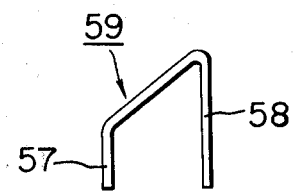
FIG. 12 is a side elevation of the bent portion in the lifter.
Figure 13:
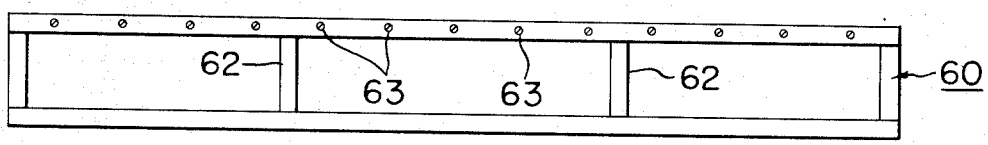
FIG. 13 is a sectional view along the line XIII—XIII in FIG. 9.

The lifter 53 has six pockets 56 formed between a left ladder portion 54 and a right ladder portion 55, and each of these pockets 56 is formed by several bent members 59, each having a different height, and the front edge 58 of each of said members 59 is higher than the rear edge 57 thereof. The base portion of each of said bent members is fixed to the upper edge of the lower frame 60. (FIGS. 9, 10 and 12)

The boundary area of the adjacent pockets 56 is defined by an intermediate ladder portion 61 of which the lower end is fixed at the upper end of the lower frame 60. A vertical facing member 62 having the shape like a hurdle as shown in FIG. 9, is provided extending downwardly from the front lower edge of all pockets 56.

Between the bar portion 63 forming the facing member 62 there is a clearance which checks the passing of fruits.

Each supporting piece 64 is a fixed bridging between the outside faces of the latter portion 54, 55 and the outside faces of the lower frame 60, and the shaft 65 provided on one supporting piece 64 has a roller 66, and likewise shaft 68 provided on other supporting pieces 67 has a roller 69, a pair of the vertically arranged rollers 66, 69 being rotatably fitted between the opposing faces 72, 73 of a pair of guide members 70, 71 fixed at both inner surfaces of the subsided portion 3. (Referring to FIG. 6).

In the lifter 53, one side pockets 56 is formed by the right ladder portion 54 and several bent members 59, another by the left ladder portion 55 and several bent members 59, and another pockets 56 are formed by the ladder portions 61 and several bent members 59. In this case, the lowest bent member is arranged at the central position, and in the right side or left side of the lowest bending member, the higher bending member is arranged in the symmetrical position.

The upper end of the supporting piece 64 is pivotally connected with the lower end of a lever 75 through a pin 74, the upper end of said lever 75 is pivotally connected with the free end of a short crank 77 through a pin 76, the base portion of the crank 77 is fixed at the outer end of a rotating shaft 80, of which both ends are supported by bearings 79 fixed at a supporting frame 78 crossing between the side portions of the frame 15. Thus the lifter 53 is suspended by the rotating shaft 80.

The driving means of the up and down movement of the movable partition walls 26 and the lifter 53 is constituted as mentioned below.

Referring to FIG. 3, in the driving means of the up and down movement of the lifter 53, a chain wheel 83 is provided at the outer end of the rotating shaft 82 of which both ends are pivotally supported by bearings 81 provided at the lower portion of the frame 15. A chain wheel 87 is fixed at the outer end of a rotating shaft 86 of which both ends are pivotally suppoted by bearings 85 fixed on a cross portion 84 which is positioned at the central portion in the vertical direction of the frame 15. A chain 88 is extended around and between the chain wheels 83 and 87. A chain wheel 89 is fixed on the rotating shaft 86, and a chain wheel 92 is fixed on the rotating shaft 91 of which both ends are rotatably supported by bearings 90 fixed at the supporting frame 78, a chain 94 extends around the chain wheels 89, 92 and adjusting wheel 93. A chain wheel 95 is fixed on the rotating shaft 91, and a chain wheel 96 is fixed on the rotating shaft 80. A chain 97 extends around and between the chain wheels 95 and 96. In FIG. 3, numeral 98 designates a tension wheel. A gear 99 is fixed on the rotating shaft 86, and a gear 102 is fixed on the rotating shaft 101 of which both ends are rotatably supported by bearings 100 mounted on the cross portion 84, said gear 102 being engaged with the gear 99, and the rotating center of the cam 43 is fixed at the outer end of the rotating shaft 101. The rotating shaft 101 is rotated by the rotating shaft 86 through the gears 99, 102, and at the same time the cam 43 is rotated together with the rotating shaft 101. A chain wheel 103 fixed at the outer end of the rotating shaft 82 is rotated by a chain 104 to be driven by the driving system from a main motor, and thus the rotating shaft 82 is rotated.

The operation of the lifter 53 will be explained in the following. The rotating shaft 91 is rotated by the rotating shaft 86 through the chain wheel 89, chain 94 and chain wheel 92. The rotating shaft 80 is rotated by the chain wheel 96 through the chain wheel 95 and chain 97. The crank 77 is rotated by the rotating shaft 80, its base portion being fixed on the rotating shaft 80. The lever 75 is swung in the vertical direction, and the lifter 53 suspended by the levers 75 through the supporting pieces 64 is moved upwardly or downwardly.

The lifter 53 carries out one vertical reciprocating movement by one rotation of the crank 77. In the upper limit of the rising movement of the lifter 53 a receiving face 105 of each pocket 56 should be in the position at least higher than a bottom face 107 of the upper end of the chute 106 for transferring the fruit a to the connecting mechanism (B), and in the lower limit of the lowering movement of the lifter 53, the front edge of the receiving face 105 should be in the position at least lower than the bottom face 11 of the file transfer portion 7 of the water tank 1.

The operation of the fruit feeding mechanism (A) will be explained in the following.

The predetermined water level 22 of the water tank 1 is formed by supplying water into the water tank 1 from the water supply pipe 5. The rotating shaft 82 is rotated by the power driving system, and the rotating shaft 86 is rotated by the rotating shaft 82 through the chain wheel 83, chain 88 and chain wheel 87. The rotating shaft 101 is rotated by the rotating shaft 86 through the gears 99 and 102 and the cam 43 is rotated. The bellcrank-shaped member comprising the lever 41, shaft 40 and lever 37 is swung about the shaft 40 by the cam follower 42 engaging with the cam face 44 of the cam 43, and as a result, the lever 35 carries out vertical movement through the pin 38. The post member 29 is moved up and down by the up and down movement of the lever 35 through the pin 36, the frame body 18 suspended by the post members 29 is moved up and down at the same time. The post member 29 is moved vetically up and down by rising or lowering along the guide posts 32 through the rollers 31, since the movable partition walls 26 fixed on the frame body 18 are designed so as to appear from the slits 23 of the intermediate bottom 17, the movable partition walls 26 protrude from the slits 23 with the lifting of the frame body 18. In this case, the holding time of the movable partition walls 26 at its upper limit is set at 7 seconds, and the holding time at its lower limit is 3 seconds, the movable partition wall 26 is intermittently moved up and down under such conditions.

Accordingly, the fruits $a$ in the random state in the fruit charging portion 2 of the water tank 1 are transferred toward the file transfer portion 7 from the fruit charging portion 2 through the bridge preventing portion 6 by water stream, but at that time, a number of the fruits are blocked when they run into the waterway 20 between the stationary partition walls 19 at the entrance portion of the file transfer portion 7 so that so-called bridging phenomenon would be occurs, but the bridge is eliminated by the movable partition walls 26, as said partition walls an up-and-down motion intermittently. Namely the fruits $a$ in the bridge and random state are in water and above the intermediate bottom 17 of the bridge preventing portion 6. Said fruits $a$ in the lapped or zigzag state are separated by rising the movable partition walls 26 from the slits 23 of the intermediate bottom 17, and then dropped between these movable partition walls 26, and as a result they are arranged in a file and transferred to the file transfer portion 7.

The fruits $a$ in a file are transferred to the file transfer portion 7 by water stream and auxiliary water stream from the injecting nozzles 51, 52.

The fruits $a$ fed from the entrance of the file transfer portion 7 into the waterways 20 formed by the stationary partition walls 19 are in a file state.

The width of the waterway 20 of the stationary partition walls 19 is equal to that formed between the movable partition walls 26. Viewed from the fruit transferring direction, the vertical face of each of the movable partition walls 26 is placed correspondingly in the same vertical plane with that of each of the stationary partition walls 19, and when the movable partition walls 26 are in the rising state, the vertical face of each of the movable partition walls 26 forms the continuous plane with that of the fixed partition walls 19.

Then the fruits $a$ are transferred from the file transfer portion 7 to the lifter 53 by water stream and auxiliary water stream produced by the injection nozzles 51, 52.

When the crank 77 is positioned at the lower dead point in the rotation, the lifter 53 is positioned at the lower limit through the lever 75 and the supporting piece 64. When the lifter 53 is positioned at the lower limit, the receiving face 105 of the pocket 56 of the lifter 53 is in each position at least lower than the bottom face 11 of the file transfer portion 7.

When the lifter 53 is moved upwardly by rotating the crank 77 from the lower dead point to the upper dead point through the lever 75 and the supporting piece 64, the fruits $a$ which are placed at the top of the file are dipped up out of water by the pockets 56 of the lifter 53.

In this case, the width of the pockets 56 viewed along the fruit transferring direction is slightly larger than the size of a fruit $a$, and accordingly the top and second positioned fruits of the file are never dipped up at the same time.

When the lifter 53 is positioned at upper limit, the rear edge of the receiving faces 105 of the pockets 56 are in the position at least higher than the bottom face 107 of the upper end of the chute 106, and accordingly the fruits $a$ on the receiving faces 105 which are inclined downwardly and rearwardly are certainly delivered to the chute 106.

During rising of the lifter 53, the first-positioned fruits $a$ on the file transfer portion 7 of the water tank 1 are prevented from invading into the underside of the lifter 53 by the engaging face 62 of the lower frame 60, and said fruits and following fruits are stopped for a short time on the file transfer portion 7.

In this manner, the feeding mechanism (A) makes it possible to forward fruits positively to the file transfer portion which enables the smooth feeding of fruits to the lifter provided at the end of the water tank and to dip up a predetermined number of fruits positively out of water in the water tank and then carry out the smooth delivery of fruits to the chute.

Also, since the filling and dipping of the fruits is effected in water, the fruits are not damaged.

CONNECTING MECHANISM (B)

The connecting mechanism (B) will now be described referring to FIGS. 15 – 20.

Figure 15:
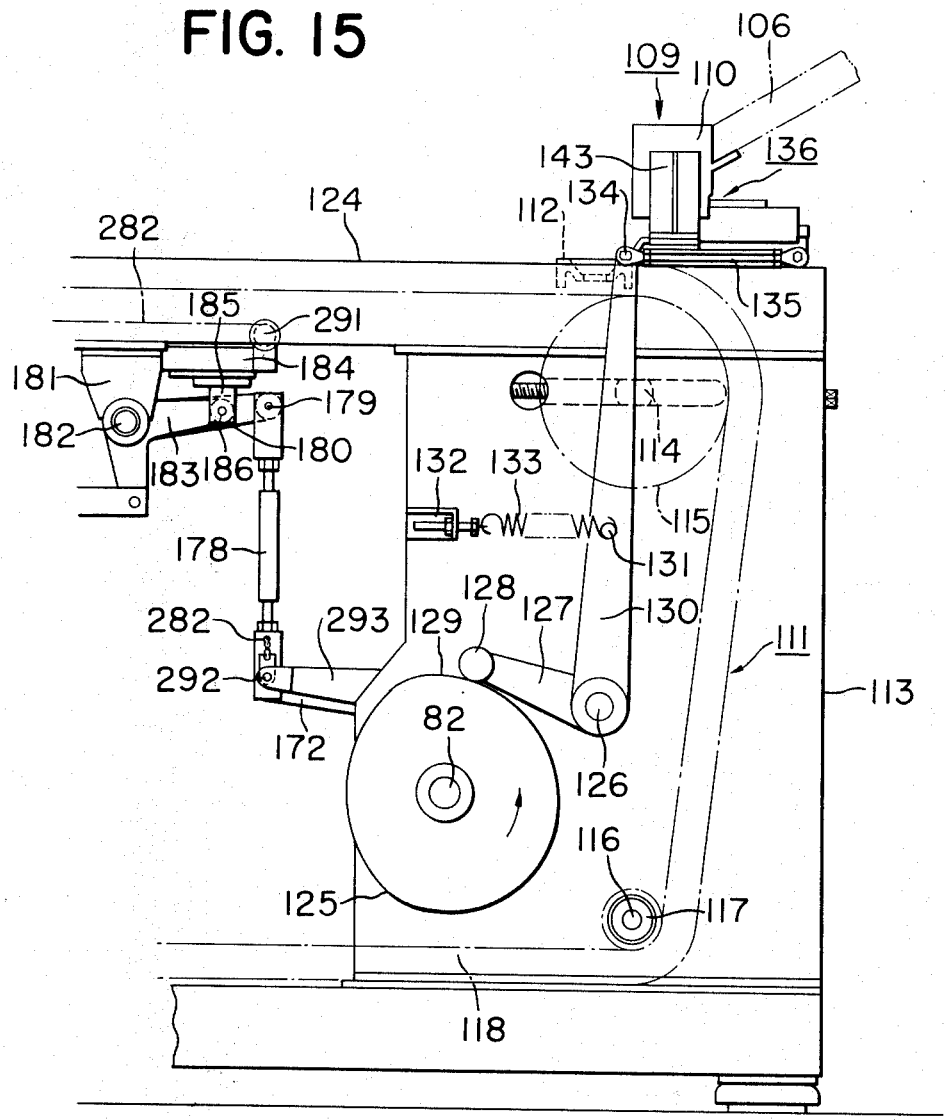
FIG. 15 is a side elevation showing the outline of the connecting mechanism in the fruit processing device of the present invention.
Figure 14:
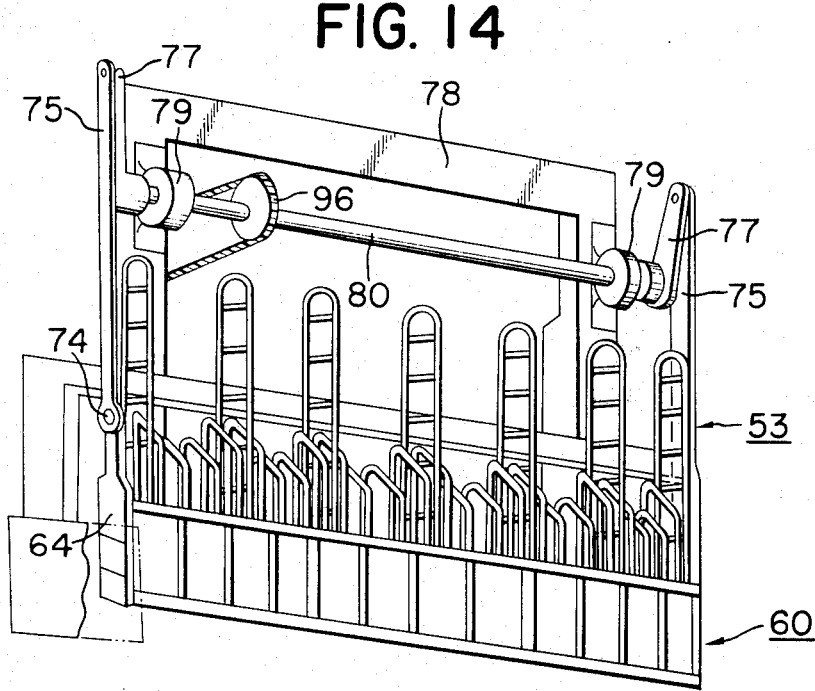
FIG. 14 is a perspective view showing particularly the lifter portion as seen from behind thereof in detail in said fruit feeding mechanism.

As shown in FIG. 15, the fruits $a$, which have been scooped up intermittently one by one by the six pockets in the lifter mechanism and forwarded respectively to the six passages in the chute 106, are transferred into each of the cup-shaped receivers 112 of a caterpillar belt 111 which moves intermittently through individual chambers 110 of a frame body 109 for temporary stop of the connecting mechanism (B).

Accordingly, the connecting mechanism (B) for placing one of the fruits from each of individual chambers 110, into the receiver 112 at the pause in the intermittent movement of the caterpillar belt 111 is constituted as follows.

Figure 16:
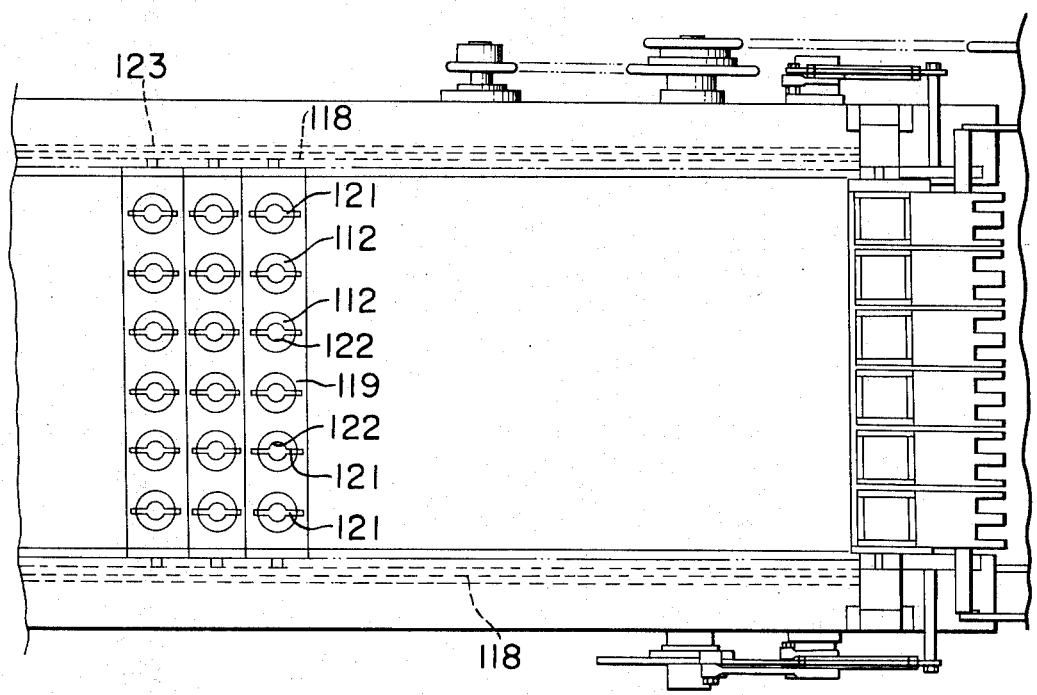
FIG. 16 is a plan view showing a part of said connecting mechanism.

Inside the machine frame 113, there are secured caterpillar belt 111 having cup-shaped receivers 112, both sides thereof are secured on the chains 118. The chains 118 pass in engagement with the chain wheels 115 fixed on both ends of the lateral shaft 114 at the inner side of the machine frame 113, which has chain wheels 117 fixed at both ends of the lateral shaft 116, said chain wheel 115 and 117 serve as the upper turning portions and the lower turning portions, respectively. Said caterpillar belt 111 has oblong members 119 extending across the belt as shown in FIG. 16, and cup-shaped receivers 112 are formed on each of the oblong members 119. In this case, six receivers 112 are spacedly arranged at equal distance in each of the oblong members 119. Each of the receivers 112 has inclined peripheral surface 120 having a bottomless dish-shaped bore 122, and cut portions 121 are formed by cutting the inclined peripheral surface 120 in a direction parallel to the breadth of the oblong member 119.

The moving route or path of the caterpillar belt 111 presents substantially a rectangular shape, and the upper route passes along the upper end portion of the machine frame 113. A cam plate 125 is secured at the outer end of the rotating shaft 82 of the machine frame 113. A cam follower 128, pivoted at the free end of the lever 127 and the base portion of which is secured on the rotating shaft 126 extending across the machine frame 113, is made to engage with the outer peripheral cam surface of the cam plate 125.

The rotating shaft 126 has a lever 130 with its lower end fixed thereto, and a spring 133 is provided, one end of the spring 133 is secured on a pin 131 provided substantially at the central portion in vertical direction of the lever 130, while the other end of the spring 133 is secured on a tension adjusting member 132 fixed on the machine frame 113. The upper end of the lever 130 is pivoted on the end portion of the pusher operating lever 135 through a pin 134.

Figure 17:
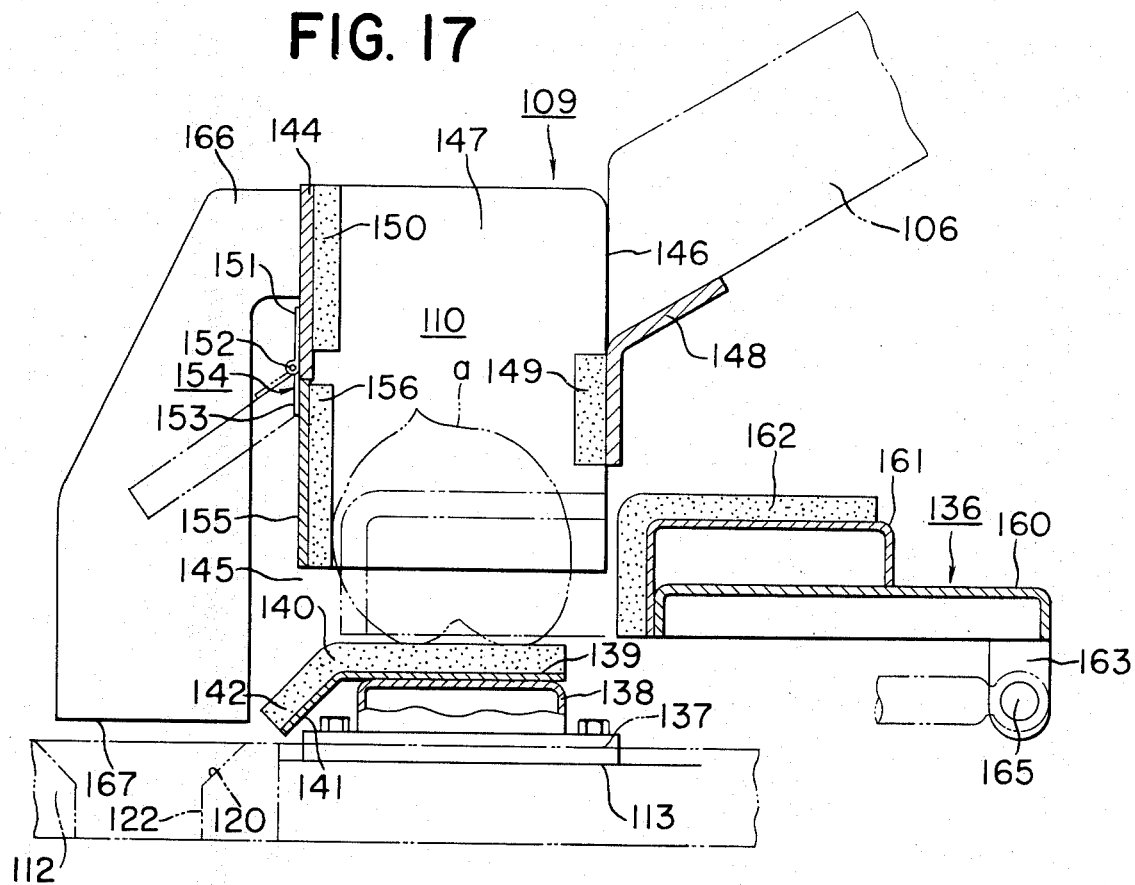
FIG. 17 is a sectional view showing the essential parts for explaining the relation between each of the individual chambers and the pusher in said connecting mechanism.

The relative construction between each of the individual chambers 110 of the frame body 109 for temporary stopping and the pusher 136 is shown in FIG. 17.

Buffer members 140 extending laterally and made of elastic material are fixed on the holding plate 139 fixed on the upper surface of the receiving base 138 which is fixed on a mounting plate 137 provided astrid both sides of the machine frame 113. These buffer members 140 form downwardly and forwardly inclined ends 142 along the downwardly bent end 141 of the holding plae 139.

A frame body 109 is disposed above the buffer members 140 and both sides thereof are secured on brackets 143 provided on the machine frame 113.

The horizontal inside dimension of each of the individual chambers 110 of the frame body 109 is selected such that the fruits can pass through vertically. The lower portion of the front wall 114 has an opening 145, and the size thereof is such that it allows one of the fruits to pass between said front wall 144 and the buffer member 140. At the rear wall 146, brackets 148 are formed to connect the rear portion of sectionalizing walls 147 and to mount the chute 106. The buffer member 149 is pasted on the chamber side of the brackets 148, both upper and lower sides of the buffer members 149 being opened. Thus, each of the passages 108 of the chute 106 and each of the chambers 110 are communicated at the upper portion.

Buffer members 150 are pasted also on the inner surface of the front wall 144. A hinge member 154 is provided with its upper piece 151 fixed on the front surface of the front wall 144, while the lower piece 153 of which is freely swingable on a mounting shaft 152. A door member 155, which is freely operable by pushing and which is fixed at the upper portion, is suspended from the lower piece 153 of the hinge member 154. The inner surface of the door 155 is pasted with the buffer member 156.

Figure 18:
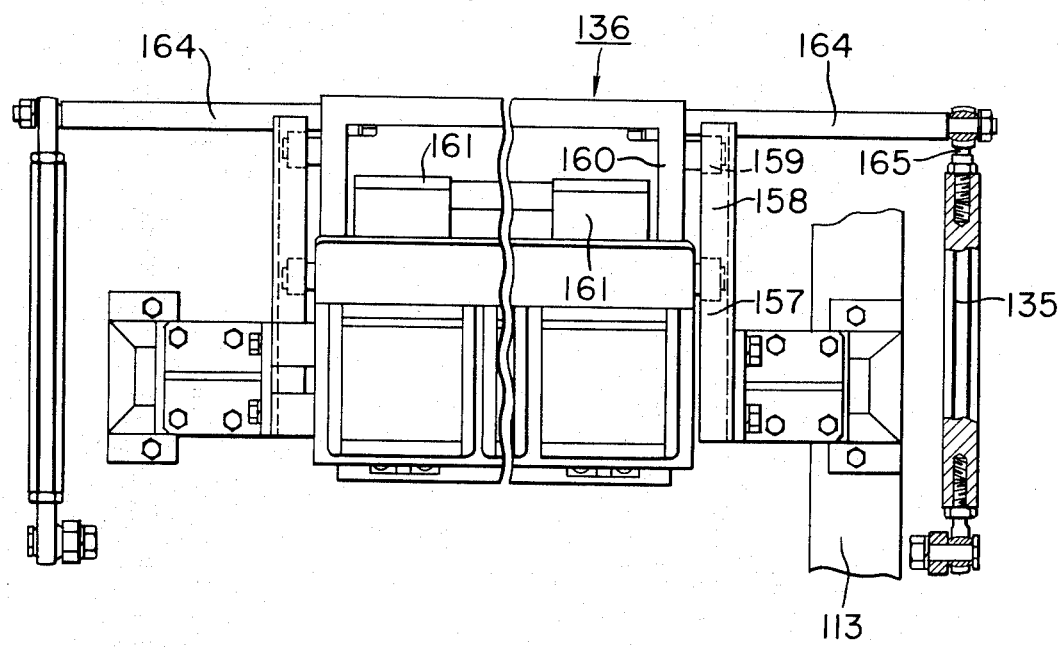
FIG. 18 is an enlarged plan view showing the part corresponding to FIG. 17.

As shown in FIG. 18, the pusher 136 is freely penetrable between the lower edge of each of the individual chambers 110 and the surface of the buffer member 140 on the upper suface of the receiving base 138, extends across both sides of the machine frame 113. Said pusher 136 is so adapted that it can slide along a groove 158 on each of guide members 157 fixed on both sides of the frame 113. The pusher 136 comprises a mounting member 160 having rollers 159 pivoted on end fact at its both sides, a pushing member 161 mounted on the upper surface in front of said mounting member 160, a buffer member 162 pasted on the upper surface and front end surface of the pushing member 161, and the actuating lever 135 pivoting its end portion on supporting pieces 163 mounted dependingly on the lower surface on both sides of the mounting member 160 through a lateral rod 164 and a joint member 165. The breadth of the pushing member 161 having the buffer member 162 is slightly smaller than the dimension between the sectionalizing walls 147 of each of the individual chambers 110.

In this case, when the intermittent movement of the caterpillar belt 111 is stopped and the cup-shaped receiver 112 is advanced up to a position shown by the imaginary line in FIG. 17, the actuating lever 135 is pulled to the left by the rotation of the cam 125 shown in FIG. 15 through the cam follower 128 and lever 127 and 130 so as to advance the pusher 136, and when the caterpillar belt 111 is moved, the pusher 136 is caused to retreat, thus the caterpillar belt 111 and the pusher 136 are driven in synchronism.

In front of the frame body 109, there are provided partition plates 166 at positions corresponding to each of the sectionalizing walls 147 for each of the individual chambers 110, and the upper rear side of the partition plate 166 is secured on the front wall 144. A small gap is formed between the lower edge 167 of the partition plate 166 and the upper surface of the cup-shaped receiver 112, said partition plate 166 serving to ensure the transfer and positioning of fruits into the receiver 112 (FIG. 17).

The horizontal forward and backward motions of the pusher 136 are effected smoothly, because rollers 159 mounted on the end face of the mounting member 160 are moved along the guide groove 158 of the horizontal guide member 157 fixed on the machine frame 113.

The connecting mechanism (B) described above operates as follows:

The fruits a passed from the chute 106 of the feeder mechanism (A) drop into the corresponding individual chambers 110 of the frame body 109 from the six passages of the chute 106, and placed on the buffer member 140 on the upper surface of the receiving base 138 below each of the individual chambers 110. At this moment, the fruits are not damaged because they are sufficiently prevented from impact by the surrounding buffer members of each of the chambers 110.

When the intermittent movement of the caterpillar belt 111 is stopped and the cup-shaped receivers 112 are passed to the position shown by imaginary lines in FIG. 17, the fruits a located as above are pushed from behind by a portion of the buffer member 162 of the pushing member 161 which is pushed by the pusher 136 moved by the synchronous rotation of the cam 125 through the follower 128, levers 127, 130, and the actuating rod 135. Then the fruits a push and open the door 155 forwardly through the buffer member 136 and drop into the cup-shaped receiver 112 through the bent end 141 of the buffer member 140 on the receiver base 138.

When the succeeding fruits are fed into each of the individual chambers 110 of the frame body 109, the fruits are once placed on the buffer member 162 of the pushing member 161 of the pusher 136, and are left on the buffer member 140 of the receiving base 138 due to the retreat of the pusher 136. The fruits thus left are transferred into the receiver 112 by the synchronous motions of the caterpillar belt 111 and the pusher 136 as described above.

When the pusher 136 retreats, the door 155 restores to its original state by gravity and returns to a state as shown in full line in FIG. 17.

By means of the connecting mechanism (B), it is possible to receive the fruits softly and to stop them temporarily and the fruits are relayed and fed into the receivers 112 of the caterpillar belt 111 positively and synchronously.

POSTURE CONTROL MECHANISM (C)

Fruits a which have been placed in the cup-shaped receiver 112 in the caterpillar belt 111 from the connecting mechanism (B) are oriented by the fruit posture control mechanism (C) at the posture control section so that the indents of the fruits are oriented substantially in the vertically downward direction, and that the sature lines of the fruits a, whose indent portions have been placed vertically below, are placed in parallel with one another.

Accordingly, the posture control mechanism (C) comprises, in the direction of the transfer, an indent finding mechanism 169 for bringing the indent portion to a vertically downward position, and a sature registering mechanism 170 for registering the sature lines of the fruits a, whose indents have been positioned vertically downward.

The indent finding mechanism will now be described referring to FIGS. 19 to 23.

A lever 172 pivoted on the rotating shaft 126 through a bearing 171 are provided in the machine frame 113, and a roller 173 is pivoted on the lever 172 at substantially center thereof. A grooved cam 176 is formed on the lateral surface of a disk member 175 fixed on the rotating shaft 82 through a holding member 174, and the roller 173 is inserted in said grooved cam 176. In this case, the lever 172 is so formed that it rotates over a predetermined angle through the roller 173 when the shaft 82 rotates integral with the disk member 175.

The end portion of the lever 172 is connected with the lower end of a vertical connecting rod 178 through a pin 177, and the upper end of the connecting rod 178 is connected to the end of a lever 180 (see FIG. 15) through a pin 179. The other end of the lever 180 is fixed on a shaft 182 of which both ends are supported by bearings 181 provided on the frame 113. The bent portion of a bellcrank lever 183 is fixed on the shaft 182, and the lateral end of the bellcrank 183 is pivoted to a shaft 186 supported by bearings 185 provided vertically on a lifting station 184.

A bearing 187 is provided vertically at a predetermined distance from the bearing 181 in the transferring direction of the fruits. The best portion of a bellcrank lever 188 is pivoted to a shaft 189 supported by the bearing 187, and the end of the lateral portion of the bellcrank lever 188 is pivoted to a shaft 191 supported by a bearing 190 provided vertically at end of said lifting station 184.

Each of the lower ends of the bellcrank levers 183 and 188 is connected by a horizontal rod 192 through pins 193.

In this case, the lifting station 184 is adapted to be maintained horizontally. Accordingly, when the rod 178 is moved vertically by the swinging motion of the lever 172, the lifting station 184 is moved up and down vertically through the lever 180, bellcrank lever 183, pin 186, bearing 185, and at the same time, through the rod 191, bellcrank lever 188, pin 190 and bearing 189.

Figure 22:
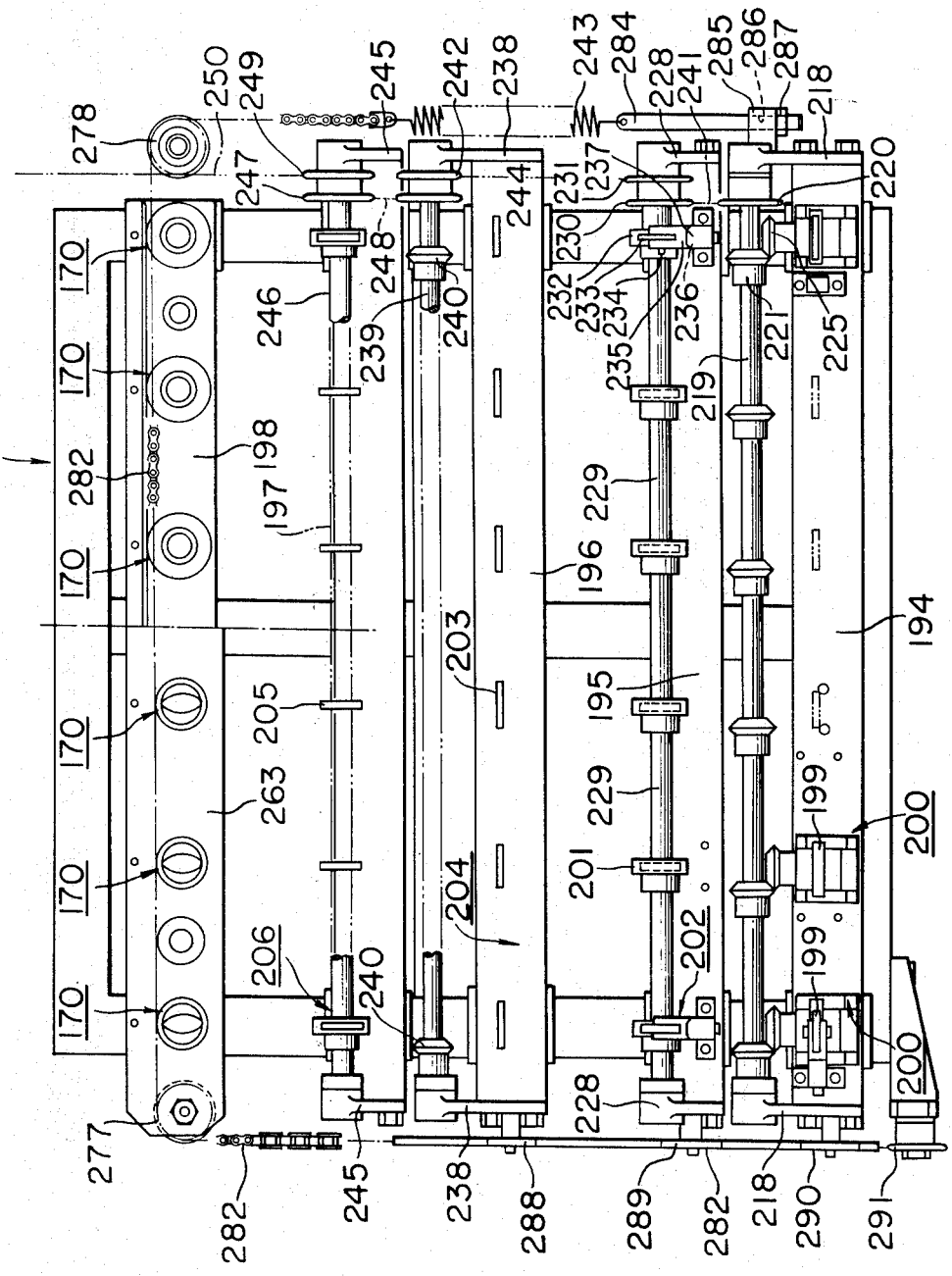
FIG. 22 is a plan view of said fruit posture control mechanism.

Referring to FIG. 22, cross plates 194, 195, 196, 197, 198 are fixed on the upper surface of the lifting station 184 in a direction perpendicular to that of the transfer of the fruits. A binder gear driving mechanism 200 for a finder pinion 199, which rotates in a direction perpendicular to the transfer direction, is mounted on the cross plate 194, and on the adjacent cross plate 195, another pinion driving mechanism 202 for finder pinion 201, which rotates in a direction parallel to the transfer direction of the fruits, is mounted. The cross plate 196 is provided with the finder gear driving mechanism 204 for a finder gear 203 which rotates in a direction perpendicular to the transfer direction, and the cross plate 197 is provided with the finder gear driving mechanism 206 for a finder gear 205 which rotates in a parallel direction.

Thus, the order for arranging the finder gears 199, 201, 203, 205 is perpendicular, parallel perpendicular, parallel. In the present example, six finder pinion driving mechanisms 200 for six perpendicular finder gears 199 are mounted as the first row on the cross plate 194, six finder gear driving mechanisms 202 for parallel finder gears 201 are mounted as the second row on the cross bar 195, six finder gear driving mechanisms 204 for perpendicular finder gear 203 are mounted as the third row on the cross plate 196, and six finder gear driving mechanisms 206 for parallel finder gear 205 are mounted as the fourth row of the cross plate 197.

Figure 20:
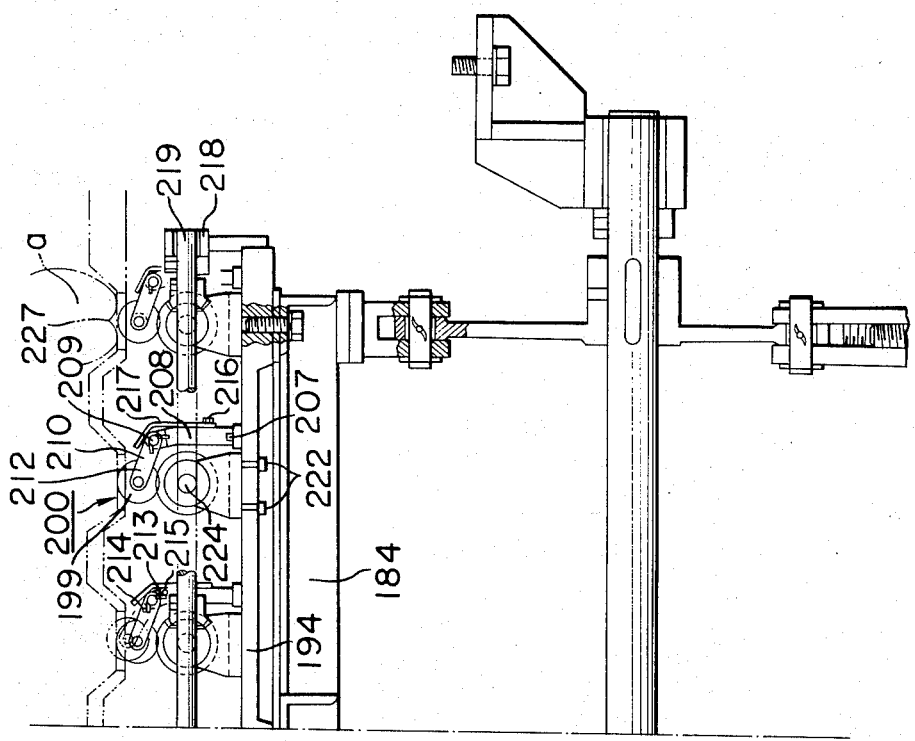
FIG. 20 is a front elevation showing the essential parts of the perpendicular rows of finder pinions of the stem indent finding mechanism in said fruit posture control mechanism.
Figure 21:
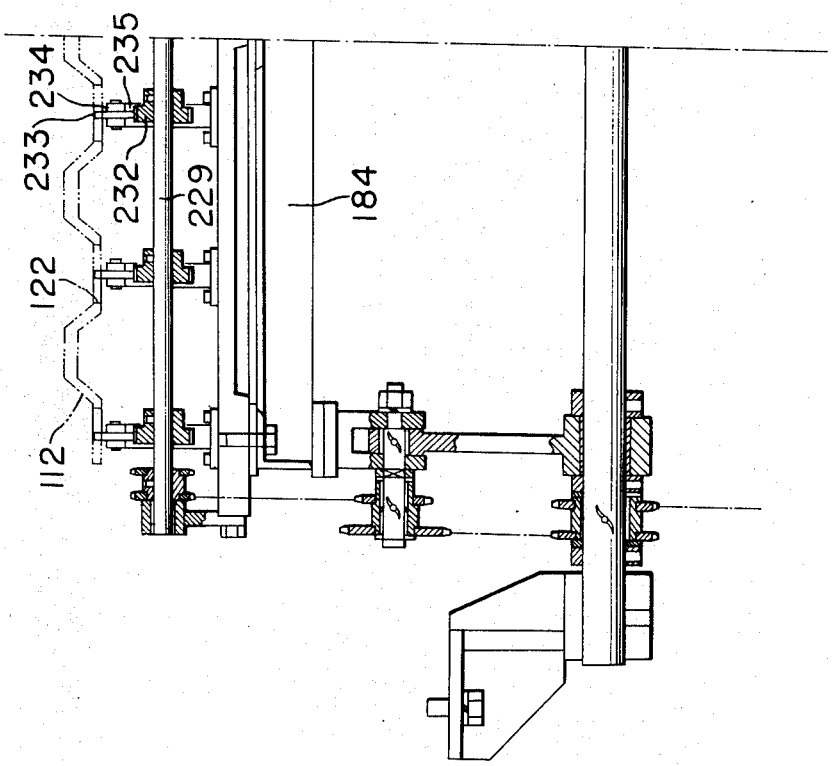
FIG. 21 is a front elevation showing the essential parts of the parallel rows of finder pinions of the stem indent finding mechanism in said fruit posture control mechanism.

As shown in FIG. 20, the finder gear driving mechanism 200 for perpendicular finder gear 199 comprises a supporting member 208 provided by fixing the base portion thereof on the cross bar 184 with a screw 207, a lever 210 pivoted by fixing the base portion thereof on the upper end of the supporting member 208 with a pin 209, and a finder gear 199 pivoted on the free end 212 of the lever 210 through a shaft. The finder gear 199 is urged upwardly by a spring 213, and it is effected as follows: Providing a stopper screw 214 on the lateral surface of the lever 210, securing one end of the spring 213 on said screw 214, securing the other end of the spring 213 on a pin 215 fixed on supporting member 208 and said spring 213 being mounted around the pin 209, a stopper 217 is fixed on the back portion of the supporting member 208 by a screw 216, whereby the upward, clockwise biasing effect of the finder gear 199 is obtained.

The upper end of the stopper 217 is adapted to engage with the back surface of the lever 210, and the upward motion of the lever 210 is stopped by the engagement of the stopper 217, whereby the upward swing limit of the lever 210 is controlled. Bearings 218 are provided respectively at the right and left ends of the cross plate 184, and a rotating shaft 219 is provided supported by said right and left bearings 218.

A chain wheel 220 is secured at the right end portion of the rotating shaft 219, and a bevel gear 221 is fixed inwardly of the chain wheel 220. A bevel gear 225 provided at the end of a shaft 224 supported by a bearing 223 fixed by the base portion through a bolt 222 on the cross plate 184 is caused to engage with the bevel gear 221, and further, a driving gear 226 is secured on the shaft 224. Accordingly, when the rotating shaft 219 is rotated, the shaft 224 is rotated by the bevel gears 221 and 225, and the driving gear 226 is rotated. This driving gear 226 is arranged such that it is engageable freely with said finder gear 199. The finder gear 199 is so formed that it can protrude slightly above the lower edge of the bore 122 of the cup-shaped receiver 112. If there are some fruits a in the bore 122 of the cup-shaped receiver 112 and the stem indent 227 of the fruit a is not located at the vertical lower side, the external periphery of the fruit a enters into somewhat lower side than the bore 122, so that the finder gear 199 is loaded by the weight of the fruit. With such a weight, the finder gear 199 is made to engage with the driving gear 226, and the finder gear 199 is also rotated when the driving gear 226 rotates. If the load on the finder gear 199 is released, the finder gear 199 shifts upwardly by the resilient force of the spring 213, and the engagement with the driving gear 226 is released.

As shown in FIG. 22, six driving mechanisms 200 are arranged on the cross plate 194 at equal distances.

On the cross plate 195, the finder gear driving mechanisms 202 for finder gear 199 are arranged in parallel.

A rotating shaft 229 is supported by bearings 228 provided at the right and left ends of the cross plate 195, and chain wheels 230, 231 are secured at the right end of the rotating shaft 229, and a driving gear 232 is fixed on the rotating shaft 229 inside the chain wheel 230. The finder gear 233 which is made freely to engage with the driving gear 232 is pivoted on the free end of the lever 235, and the lower end of the lever 235 is pivoted on the upper end of a supporting member 236 provided on the cross plate 195, whereby the upper transferring limit of the lever 235 is regulated by the upper end of the stopper 237 fixed at the back portion of the support member 236.

The parallel finder gear 233 is arranged such that it also protrudes slightly above the bore 122 of the cup-shaped receiver 112.

Basically, both the parallel finder gear driving mechanism and the perpendicular finder gear driving mechanism have a similar construction.

Six parallel finder gear driving mechanisms 202 are disposed as the second row on the cross plate 195 at equal distance.

The third row consisting of six perpendicular finder pinion driving mechanisms 204 are provided on the cross plate 196. This row is identical to the finder gear driving mechanisms 200 in the first row.

On the cross plate 197, there is provided the fourth row consisting of six parallel finder gear driving mechanism 206. This row is identical with the finder gear driving mechanism 202 of the second row.

Referring to FIG. 22, it is seen that a chain 241 is passed over the chain wheel 220 fixed on the rotating shaft 219 of the finder gear driving mechanism 200 of the first row and the chain wheel 230 fixed on the rotating shaft 229 of the finder gear driving mechanism 202 of the second row. A chain 243 is passed over a chain wheel 242 fixed on the rotating shaft 239 of the finder gear driving mechanism 204 of the third row and another chain wheel 231 of the rotating shaft 229 of the second row. A chain 248 is passed over another chain wheel 244 fixed on the rotating shaft 239 of the third row and the chain wheel 247 fixed on the rotating shaft 246 of the fourth row. One end of a chain 250 is engaged with the chain wheel 249 fixed on the rotating shaft 246 of the fourth row.

Figure 19:
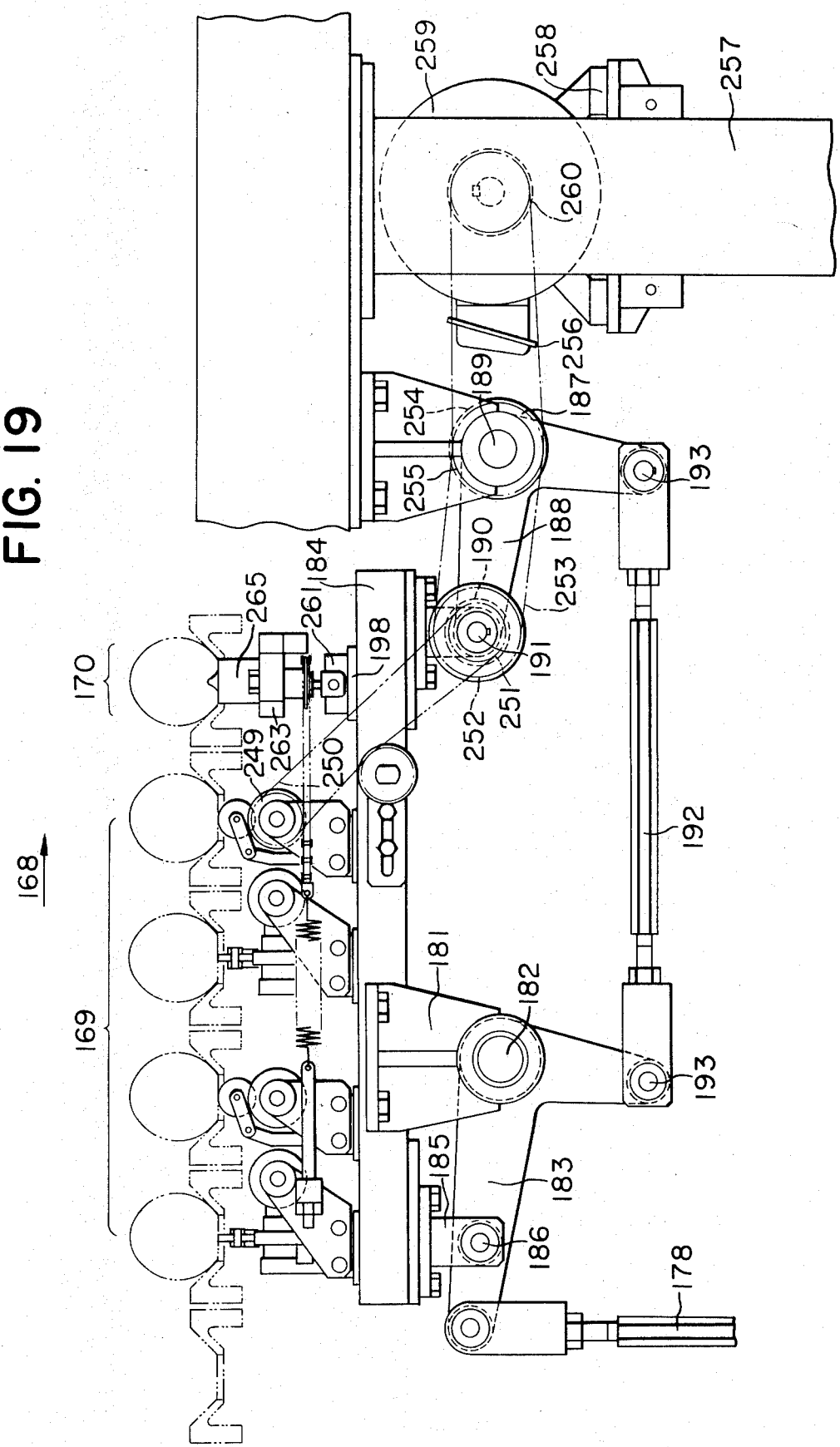
FIG. 19 is a side elevation showing the essential parts of the posture control mechanism in the fruit processing apparatus according to the present invention.

Referring to FIG. 19, the other end of said chain 250 is engaged with the chain wheel 251 fixed on the shaft 190 supported on bracket 188, one end of a chain 253 is engaged with a chain wheel 252 integral with said chain wheel 251 and the other end of the chain 253 is engaged with a chain wheel 254 pivoted to the rotating shaft 189 supported by the bearing 187. One end of a chain 256 is engaged with another chain wheel 255 fixed together with the chain wheel 254, and the other end of the chain 256 is engaged with a chain wheel 260 fixed on the shaft of a motor 259, said motor being mounted on a base 258 provided on a vertical bar portion 257 of the machine frame 113.

As shown in FIGS. 19 to 23 and 24 to 26, the sature registering mechanism 170 in the fruit posture controlling mechanism (C) is arranged, for locating the stem indent of the fruit at the vertically lower side thereof, at the next stage of the fourth finder gear driving mechanism 206.

Six sature registering mechanisms 170 are provided on a cross plate 198 mounted on the lifting station 184, at a position corresponding to the bores 122 of the cup-shaped receiver 112. The sature registering mechanism 170 is shown in FIGS. 19 to 22 and 24 to 26. A block 261 is fixed on the upper surface of the cross plate 198 provided on the lifting station 184, and a bore 262 is formed vertically through the block 261.

Another cross plate 263 is provided parallel to the cross plate 198 above the block 261. Six cups 265 which are made freely rotatable by a bearings 264 are disposed on said cross plate 263, at equal distance, corresponding to the finder gears, and a through hole 267 is formed in a cylindrical portion 266 below each cup 265. An indent portion 269 is formed successive to the space portion 268 of the cup 265, and a positioning rod 270 is inserted through the spaced portion 268, indent portion 269 and the through hole 267. A spring 273 is inserted between a stopper 271 fixed on the upper portion of the positioning rod 270 and a stepped portion 272 in the indent portion 269. By inserting the parallel portion 274 formed at the lower portion of the positioning rod 270 into the bore 262 formed in said block 261, and at the same time, by fitting a fixing member 276 having parallel, opposed planes 275 at its top end between the parallel portion 274 and the bore 262, the lower portion of the positioning rod 270 is secured.

A chain wheel 276' is fixed at the lower portion of the cylindrical portion 266, and chain wheels 277, 278 are pivoted at both end faces of the cross plate respectively.

A wedge-shaped projection 279, having a shape complementary to the indent portion of the stem so as to fit into the stem indent 227 of the fruit a, is formed at the upper end of the positioning rod 270, the distance between both sides or the thickness of the wedge-shaped projection 279 decreases gradually from the lower portion towards the upper portion.

The skirt portions of the wedge-shaped projection 279 terminate at the upper top surface 281 of the positioning rod 270.

Accordingly, the positioning rod 270 can freely move up and down at the center of the cup 265, but it is made unable to rotate due to the construction at the lower portion of the positioning rod 270. The spring 273 gives lifting tendency to the positioning rod 270.

As shown in FIG. 22, six sature registering mechanisms 170 are provided on the cross plate 198. The chain wheels 276' of these mechanisms 170 are connected by a chain 282. As shown in FIG. 22, the chain 282 extends along the side of the lifting station 184 rotating the chain wheel 278 pivoted on the cross plate 198 at the right hand upper portion. One end of the chain 282 is fixed to one end of a coil spring 283, the other end of the coil spring 283 is fixed to an adjusting bolt 284. This adjusting bolt 284 is screwed into a threaded hole 286 of the supporting piece 285 projecting from the cross plate 194, and a nut 287 is screwed on the outer end of the bolt 284.

The left hand corner portion of the chain 282 surrounds the chain wheel 277 along the other side of the lift station 184, and returns to a chain wheel 291 through the chain wheels 288, 289 and 290. Further, said chain 282 is pivoted on the free end of the lever 293 through a pin 292 (FIG. 15).

Figure 23:
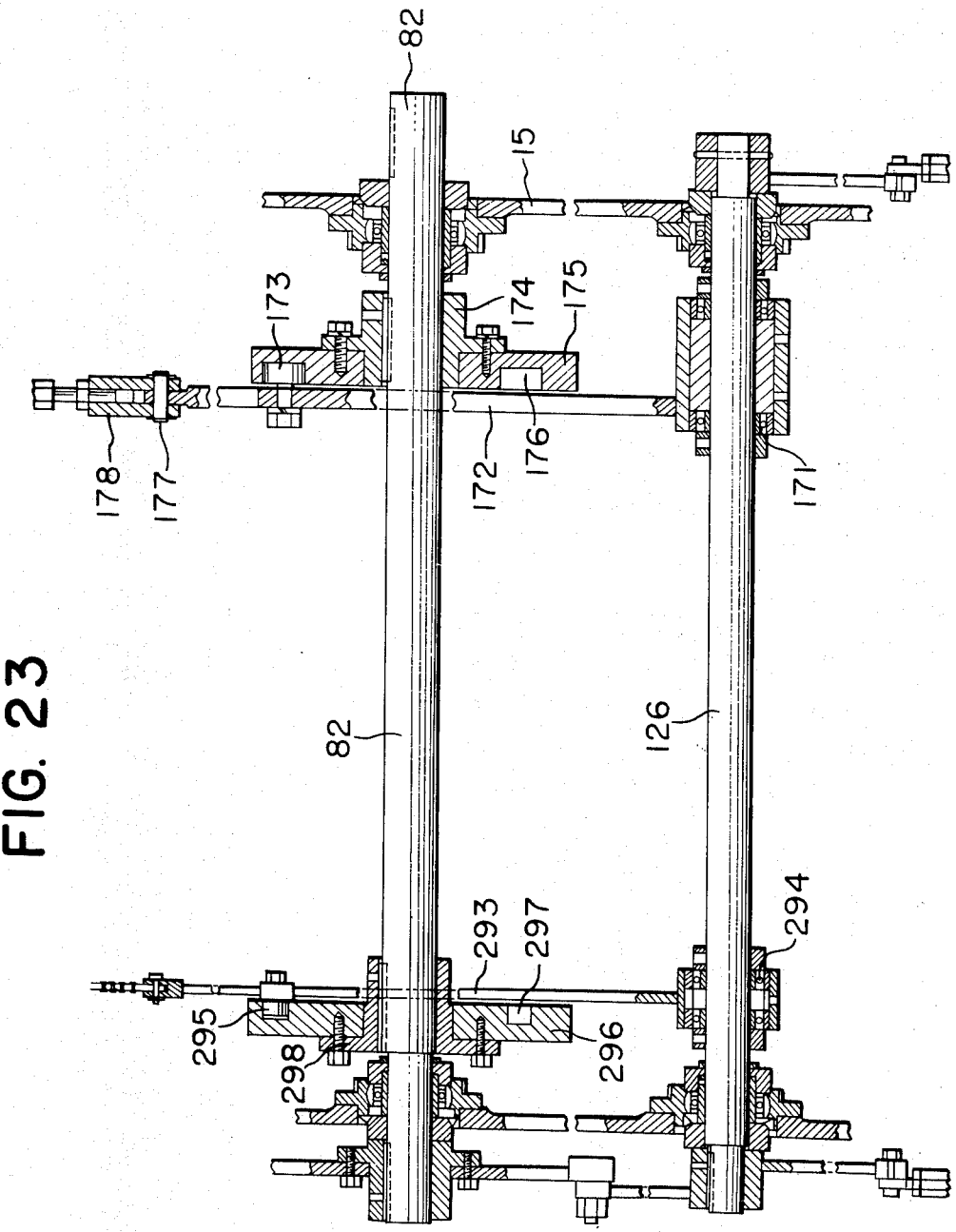
FIG. 23 is a plan view showing the driving mechanism of said fruit posture control mechanism.
Figure 24:
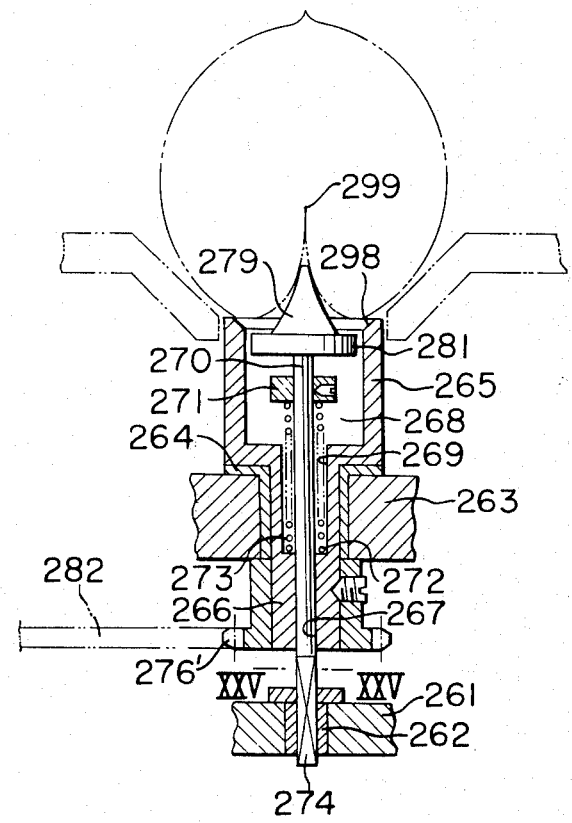
FIG. 24 is a sectional view showing the essential parts of the sature registering mechanism in said fruit posture control mechanism.
Figure 25:
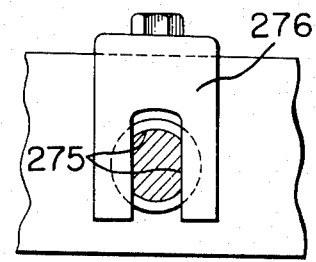
FIG. 25 is a sectional view along the line XXV—XXV in FIG. 24.
Figure 26:
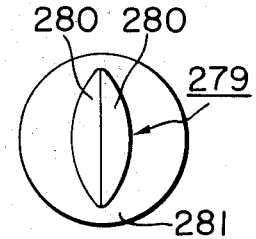
FIG. 26 is a plan view of the positioning rod in said sature registering mechanism.

As shown in FIG. 23, the base portion of a lever 293 is pivoted on the rotating shaft 126 through a bearing 294. A roller 295 is pivoted at substantially the center in the longitudinal direction of the lever 293, and this roller 295 is fitted in a cam groove 297 provided at the lateral surface of a disk member 296. The disk member 296 is fixed on the rotating shaft 82 by means of a fixing member 298. In this case, it is so constituted that when the disk member 296 is rotated together with the rotating shaft 82, the lever 293 is rotated for a predetermined angular extent through the roller 295.

Therefore, when the disk member 296 is rotated and the lever 293 is moved vertically through the cam groove 297 and the roller 295, the chain 282 moves forwardly and backwardly. At this time, since the coil spring 283 is provided at the end portion of the chain 282, the chain 282 is never slackened when it is pulled or returned. With such a forward and backward motions of the chain 282, the chain wheels 276' of the sature registering mechanisms 170, which are engaged with the chain 282, make a reciprocating motion for a predetermined angle.

The posture control of the fruits $a$ according to the posture control mechanism (C) is carried out as follows:

When the fruit $a$ is passed from the connecting mechanism (B) and placed in the cup-shaped receiver 112, the lower peripheral surface of the fruit $a$ has been brought in contact with the inclined peripheral surface 120 of the cup-shaped receiver 112 if the stem indent 227 of the fruit $a$ is not located vertically downwardly (this happens in most cases).

At the same time when the fruit $a$ is placed on a receiver 112 in such a state, the lifting station 184 rises and the finder gear 199 is raised up to contact with the peripheral surface of the fruit $a$. At this moment, the finder gear 199 approaches the driving gear 226 as shown in FIG. 20, and they come into engagement with each other, whereby the finder gear 199 is rotated by the driving gear 226 which is always put under rotation. Accordingly the fruit $a$ is caused to rotate within the receiver 112 by the rotation of the finder gear 199.

Thus, when the weight of the fruit $a$ is applied on the finder gear 199, the finder gear 199 engages with the driving gear 226 while rotating the lever 210 in a counterclockwise direction.

When the fruit $a$ is rotated by the finder gear 199 as the upper portion of the finder gear 199 enters into the stem indent 227 of the fruit $a$, the weight of the fruit $a$ is not applied onto the finder gear 199, whereby the finder gear 199 and the driving gear 226 are disengaged by means of the resilient force of the spring 213. When the engagement is released, the finder gear 199 is not entrained to rotation even if the driving gear 226 is rotated constantly.

In this manner, the stem indent 227 of the fruit $a$ is detected or searched for by means of the finder gear 199 due to the rotation or stop of the finder gear 199, and the fruit $a$ stops when the stem indent 227 is located at the vertical lower position.

If the stem indent does not come into registration with the finder gear in the first row, in other words, if the stem indent is not directed vertically downwardly during the pause of caterpiller belt 111 which stops for a time after the lifting station 184 has been raised, that is, during the time in which the finder gear driving mechanism is located directly below the bore 122 of the receiver 112, the fruit $a$ is forwarded by one-pitch advancement of the receiver 112 by the intermittent movement of the caterpillar belt 111. When the receiver 112 is in a stopped state, the finder gear in the second row searches for the stem indent 227 by turning the fruit $a$ again in the receiver 112 due to the synchronous uplift of the lifting station 184.

Each of the finder gears from the first row to the fourth row are so arranged that they have a phase difference of 90° with one another in their successive order of perpendicular, parallel, perpendicular, parallel, . . ., so that it is possible to locate all of the fruits $a$ in the vertical downward position when they reach the fourth row from the first row.

The fruit $a$, the stem indent 227 of which has already been located at vertically downward position, will not be disturbed of its posture during its way to the following row caused by the intermittent advancement of the receiver 112. The reason is that, since the lifting station 184 is synchronously lowered at the transfer of the receiver 112, there is no possibility that the bottom peripheral portion of the fruit $a$ is turned by the following finder gear.

Also, even if the finder gear of the succeeding finder gear driving mechanism is raised, the finder gears and the driving gears will not be engaged, because the upper portion of the finder gear has already entered into the stem indent, provided that the stem indent of the fruit $a$ had been directed downward, thus there will be no chance of the fruit $a$ being rotated.

In this manner, when the receiver 112 passes over the fourth row of the finder gear driving mechanism, and after the stem indent 227 of the fruit $a$ located in the receiver 112 was placed in vertical lower side, the fruit $a$ is advanced by the intermittent movement of the receiver 112, and the fruit $a$ reaches above the sature registering mechanism 170.

The cup 265 enters into the bore 122 of the receiver 112 with the synchronous uplift of the lifting station 184, and the upper peripheral inclined surface 298 of the cup comes in contact with the ridge portion around the stem indent 227 of the fruit $a$, which raises the fruit $a$. Since the cup 265 makes a reciprocating motion by means of the chain wheel 276 and chain 282, the wedge-shaped projection 279 of the positioning rod 270, which is in contact with the lower surface of the fruit $a$ and which rises together with the cup 265, is raised by the spring 273 when the fruit $a$ is turned by the cup 265, and the stem indent 227 registers with the wedge-shaped projection 279. Thus the wedge-shaped projection 279 restrains the fruit $a$, and at the same time causes the fruit $a$ to float up slightly.

The sature line of the fruit $a$, which has been positioned by the positioning rod 270, is oriented in a direction of the wedge line of the wedge-shaped projection 279, that is, the direction of front and rear.

At this time no inconvenience is ever experienced in the successive slivering stage whichever direction the sature line of the fruit is turned, provided that the fruit is oriented in a direction of front or rear with respect to the transfer direction of the fruit.

Accordingly, with this posture controlling mechanism (C), it is possible to orient the sature line 299 of the fruit, which was placed in the cup-shaped receiver 112, to a required direction after the stem indent portion of the fruit has been located directly therebelow.

FRUIT SLIVERING MECHANISM (D)

The fruit slivering mechanism (D) is positioned adjacent to the posture control mechanism (C).

Figure 27:
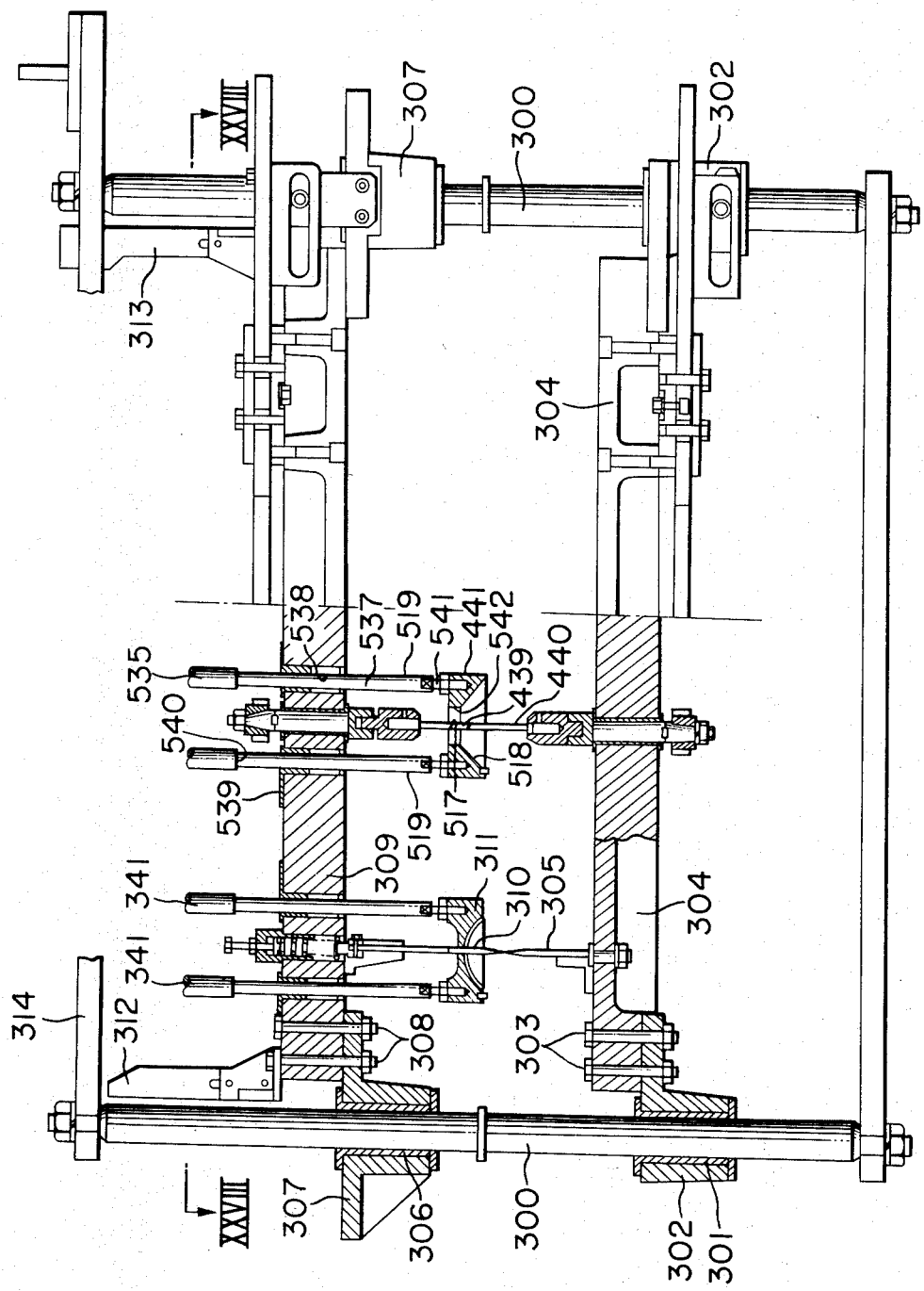
FIG. 27 is a front elevation showing the essential parts of the fruit slivering mechanism and the fruit pitting mechanism in the fruit processing apparatus according to the present invention.

As shown in FIG. 27, the slivering mechanism (D) has a vertically movable lower frame 304, of which both ends are fixed on fitting members 302 by a bolt 303, said fitting members 302 being fitted on guide poles 300 provided on both sides of the frame 113 through a bush 301. Lower cutters 305 for slivering fruit are equidistantly fixed on its base portion of the movable frame 304 in the lengthwise direction.

The slivering mechanism (D) has a vertically movable upper frame 309, of which both ends are fixed on fitting members 307 by bolts 308, said fitting members 307 being fitted on the guide poles 300 through a bush 306. On the movable upper frame 309 there are mounted downwardly extending upper cutters 310 for slivering at the corresponding position to the lower cutters 305, said upper cutters 310 being placed equidistantly.

A fruit holder 311 is provided around the upper cutter 310.

Figure 28:
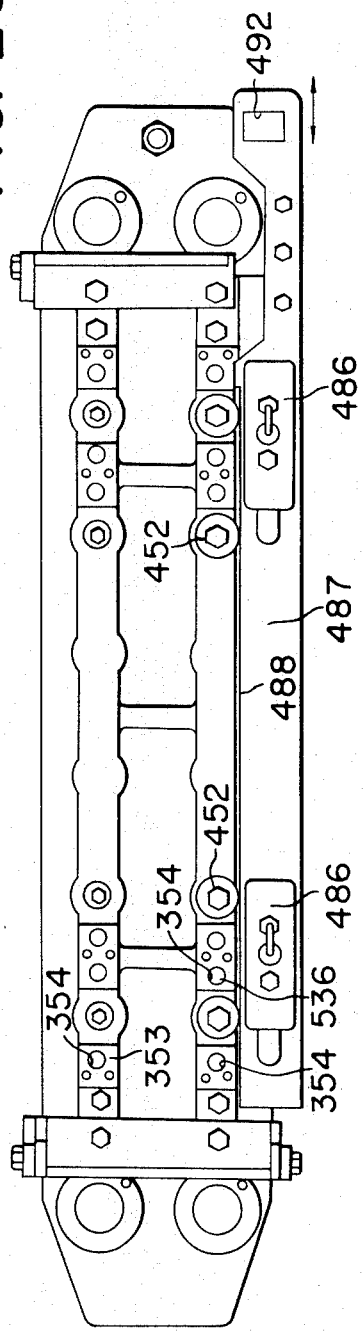
FIG. 28 is a plan view as seen from the line XXVIII—XXVIII in FIG. 27.

On the upper surface of the movable upper frame 309, one plate cam 312 is provided at one end of the frame 309 and the other plate cam 313 is provided at the other end of the frame 309 (FIG. 27 and 28).

Figure 30:
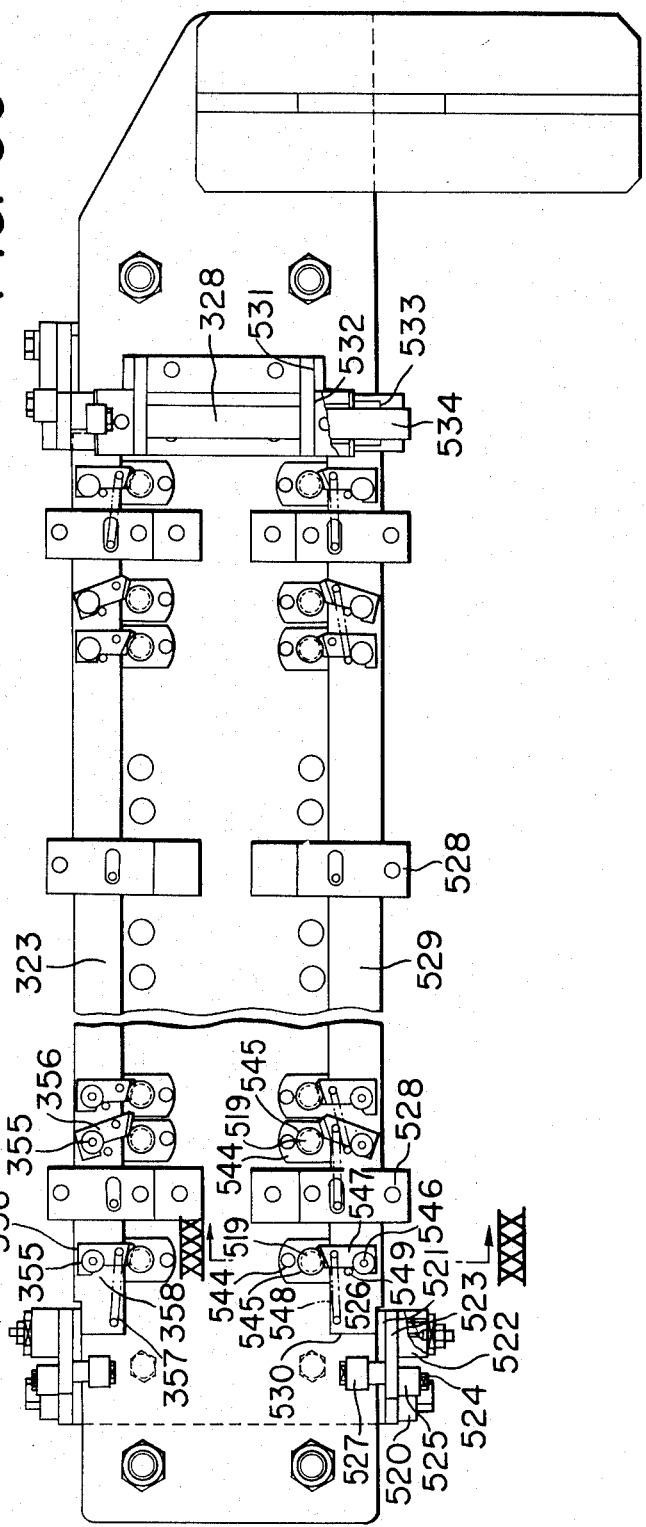
FIG. 30 is a plan view showing particularly the fixed frame portion in detail in FIG. 29.
Figure 29:
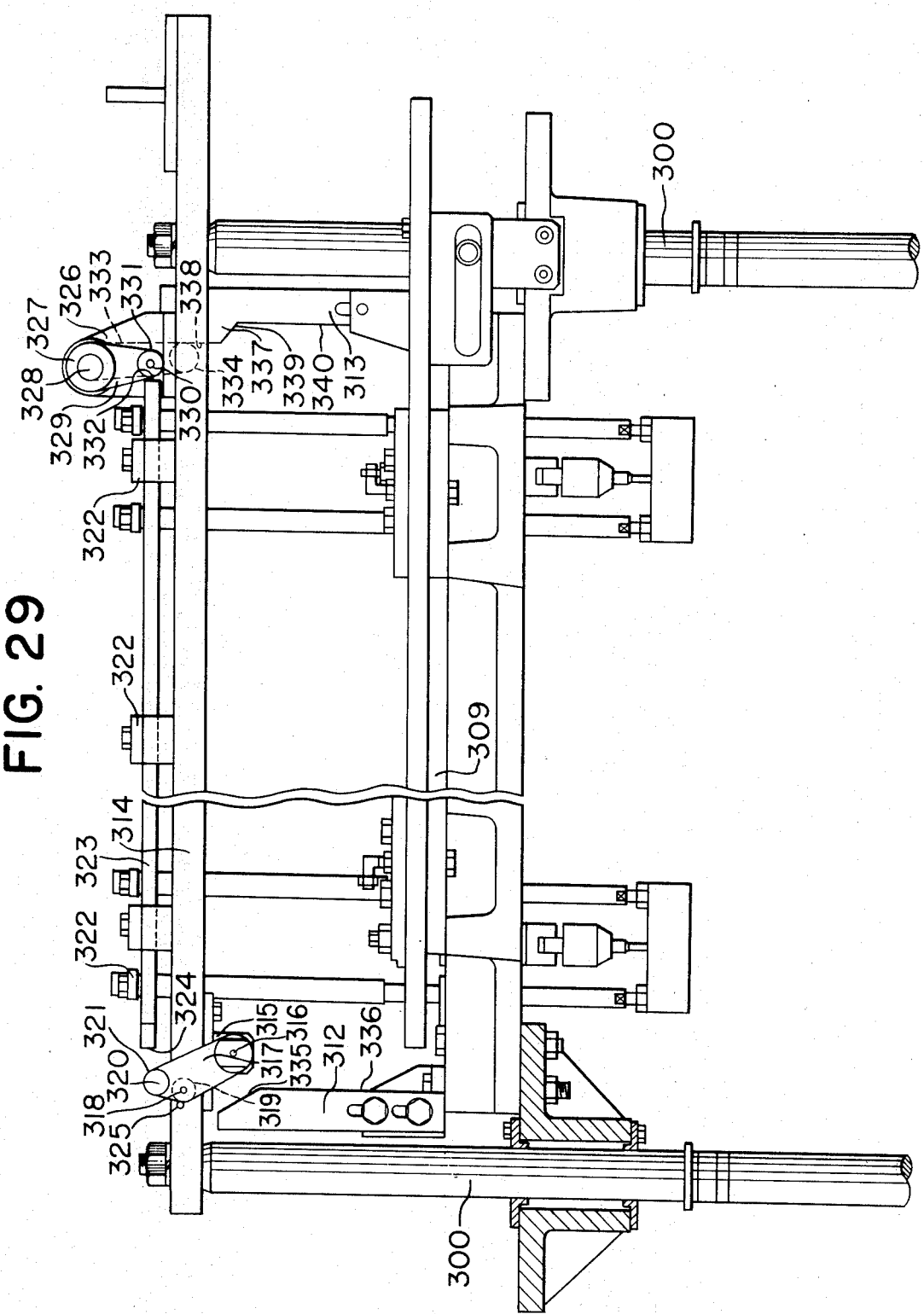
FIG. 29 is a front elevation showing particularly the vertically movable upper frame and the vertically movable lower frame in said fruit slivering mechanism and the fruit pitting mechanism.

Referring now to FIGS. 29 and 30, a fixed frame 314 is bridged across the top ends of the guide poles 300. A lever 317 is pivoted at its lower end with a shaft 316 provided at a supporting piece 315 which is fixed at the lower surface of one end of the fixed frame 314, and the lever 317 has one cam follower 319 mounted by a pin 318 at the upper side portion, and the other cam follower 321 is mounted by a pin 320 at the top portion of the lever 317.

A control bar 323 is provided at the upper surface of the fixed frame 314, said control bar 323 being freely movable horizontally in the right and left directions on the fixed frame 314 through sliding and supporting members 322 mounted on the frame 314. The cam follower 321 is positioned to be engaged with the end face 324 of the control bar 323. When the lever 317 engages with a pin 325 mounted on the fixed frame 314, said lever 317 does not rotate in a counterclockwise direction.

A supporting member 326 is provided at the right end on the surface of the fixed frame 314. A lever 329 is provided on the shaft 328 supported by a bearing 327 which is mounted at the top portion of the supporting member 326. A roller 331 pivoted on the lower end of the lever 329 by a pin 330 is formed engageable with the right end face 332 of the control bar 323. A cam follower 334 is mounted at the lower end of the lever 333, of which the upper end is fixed on the shaft 328.

Figure 31:
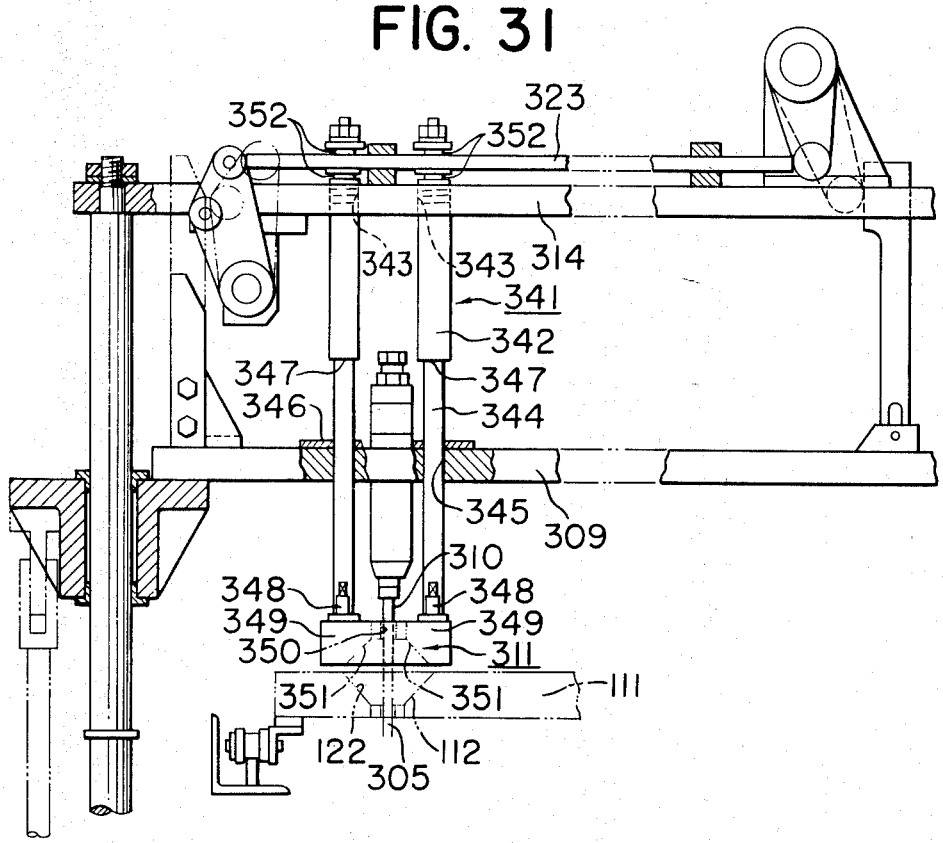
FIG. 31 is an enlarged view explaining the fruit holder operating mechanism in said fruit pitting mechanism.

When the movable upper frame 309 is raised, the cam 312 provided on the vertically movable upper frame 309 rotates the lever 317 in a clockwise direction viewed from FIG. 31 through the cam follower 319 of the lever 317, because said cam follower 319 is pushed by the inclined surface 335 of the cam 312.

When the vertical side face 336 of the cam 312 is engaged with the cam follower 319, the lever 317 can be rotated up to the maximum angle in a clockwise direction.

The cam 313 which is provided on the right end of the movable upper frame 309 has a large width portion 337 having a side surface 338, transportation side surface 339 and vertical side surface 340, and these surfaces engage with the cam follower 334 of the lever 333.

When the movable upper frame 309 is further raised from the state where the cam follower 334 of the lever 333 is engaged with the side surface 338 of the large width portion 337 of the cam 313, and then when the cam follower 334 is engaged with the vertical side surface 340 through the transportation surface 339, the lever 329 becomes freely swingable through the shaft 328 and the lever 333, and also the roller 331 leaves the right end of the control bar 323 (FIG. 29).

As shown in FIG. 31, supporting rods 341 support the fruit holder 311 disposed around the upper cutter 310 and have an upper large diameter portion 342 and a lower small diameter portion 344, and said upper large diameter portion 342 is inserted into a vertical hole 343 formed in the fixed frame 314, and the lower small diameter portion 344 is inserted into a vertical hole 345 formed in the vertically movable upper frame 309. A metal 346 provided on the circumference of the vertical holes 345 is formed engageable with the stepped portion 347 formed by the difference between the large diameter portion 342 and the small diameter portion 344.

The fruit holder 311 suspended by the lower end of the supporting rods 341 comprises two members 349, formed symmetrically with each other each having the shape of an inverted cup and a linear clearance 350. A downwardly inclined peripheral surface 351 of the fruit holder 311 has the same shape as the inclined peripheral surface 122 of the cup shaped receiver 112.

A number of peripheral grooves 352 are provided at the upper end portion of the supporting rods 341 of which upper ends are passed through holes 354 and brackets 353 projected from the fixed frame 314 as shown in FIG. 28.

Referring to FIG. 30, pawls 356, which are rotatable horizontally with pins 355 as the center, are secured on the upper surface of the control bar 323, and each of the pawls 356 on each of these pins is urged to rotate in a direction to engage with the peripheral grooves 352 of the supporting rods 341, respectively, by means of tension springs 357, but the rotation of pawls 356 is restricted so as not to exceed the normal engaging position by the stopper pins 358.

A plurality of sets (in this example, 6 sets) of said fruit holder 311 and upper cutter 310 are provided corresponding to the predetermined number of simultaneous processing in the slivering mechanism (D), and the number of the cup shaped receivers is six.

The related elements of the upper cutter and the fruit holder are formed on the vertically movable upper frame 309 and the fixed frame 314.

Figure 32:
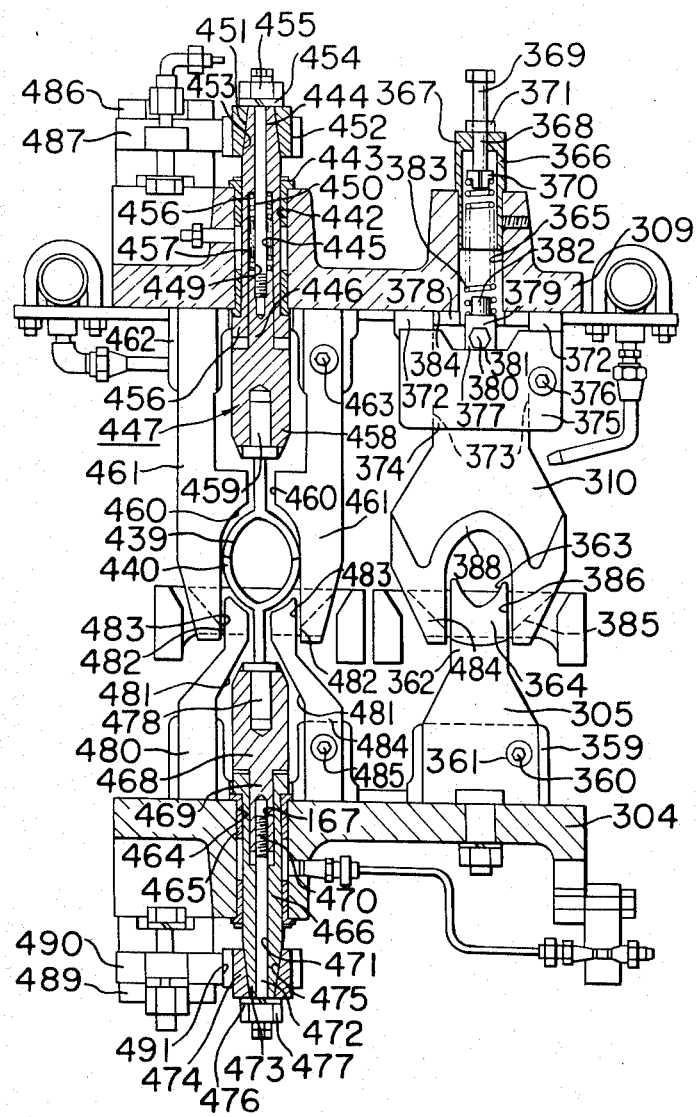
FIG. 32 is a sectional view showing in detail the upper cutter, lower cutter and the upper rotary cutter and the lower rotary cutter, respectively, of said fruit slivering mechanism and the fruit pitting mechanism.

The lower cutter 305 and the upper cutter 310 of the slivering mechanism (D) are formed as shown in FIG. 32.

Namely, the lower cutter 305 is fixed at the side surface of a mounting portion 359 provided on the movable lower frame 304 by a bolt 360 and a nut 361, said lower cutter 305 having a flat plate shape in the side view and a small width portion 362 at its upper portion as seen in the front view, a concave portion 363 on the top, and an edge 364 which is formed from the concave portion 363 of the lower cutter 305 to the vertical central portion thereof.

The upper cutter 310 has a safety and buffer device for absorbing the impact force caused at the fruit slivering time.

In said safety and buffer device, as shown in FIG. 32, a cup-shaped member 366 is fitted into the upper portion of the vertical holder 365 provided on the vertically movable upper frame 309. A bolt 369 is inserted into an inserting hole 368 provided at the top portion 367 of the cup-shaped members 366. The spring receiver 370 is fixed on the inner end of the bolt 369, and the nut 371 is screwed on the outer end of the bolt 369.

The mounting portions 372 are fixed on the lower surface of the movable upper frame 309 between the opposing faces 373 of these mounting portions 372. The parallel portion 374 of the upper cutter 310 is inserted between the opposing faces 373. Abutting plates 375 engage respectively with the front and rear surfaces of the parallel portion 374, each abutting plates 375 being joined by screws 376 and are fixed to the mounting portion 372. The abutting plate 375 has a stop edge 377 by cutting the upper portion thereof. A clamper 379 is inserted into the upper edge 378 of the upper cutter 310 projected from the stop edge 377, said clamper 379 and the upper cutter 310 being jointed by a bolt 380, and the lower side 381 of the clamper 379 being placed on the stop edge 377.

A spring receiver 382 projected from the upper surface of the clamper 379 is inserted into the vertical hole 365 of the movable upper frame 309. A spring 383 is fixed at its lower end with the spring receiver 382 and at its upper end with the spring receiver 370 formed at lower end of the bolt 369. Thereby the upper cutter 310 is urged downwardly by the elastic force of the spring 383 through the clamper 379. A vertical clearance is formed between the upper edge 378 of the upper cutter 310 and the lower surface 384 of the vertically movable upper frame 309, whereby the upper cutter 310 is movable upwardly through the clamper 379 and by the elastic force of the spring 383 when the upper cutter 310 receives an impact force, thus the impact force is absorbed.

The lower portion of the upper cutter 310 forms the bifurcated portions 385 and the parallel side surfaces 386 are formed on the bifurcated portion 385. The upper edge 364 of the lower cutter 305 is inserted between the parallel side surfaces 386 formed on the bifurcated portion 385. A curved interior portion is provided continuously with the parallel side surfaces 386, and an edge 388 is formed between the parallel side surface 386 and the curved interior portion continuously.

The vertically driving means of the vertical movable upper frame 309 will be explained hereinafter.

Figure 34:
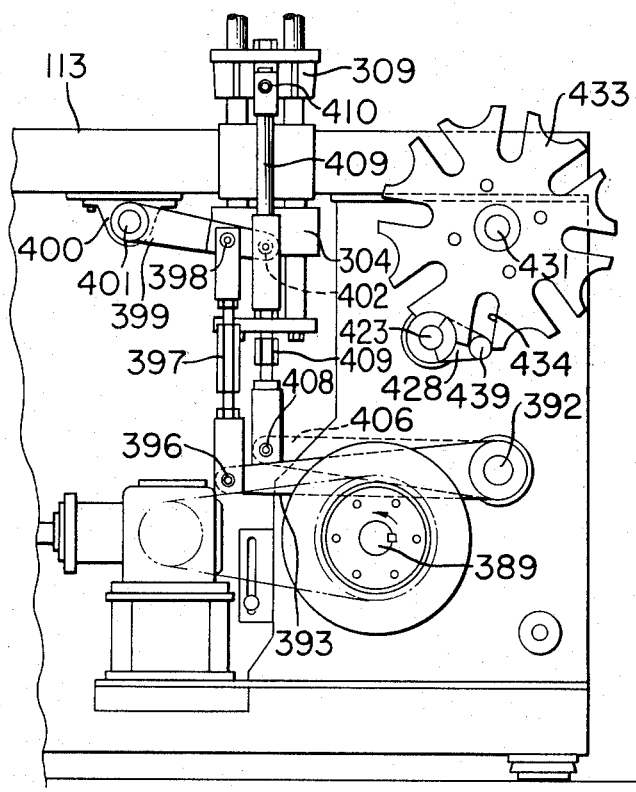
FIG. 34 is a side elevation showing said fruit slivering mechanism and fruit pitting mechanism as well as the intermittent driving mechanism of the caterpillar belt having cup-shaped receivers.
Figure 33:
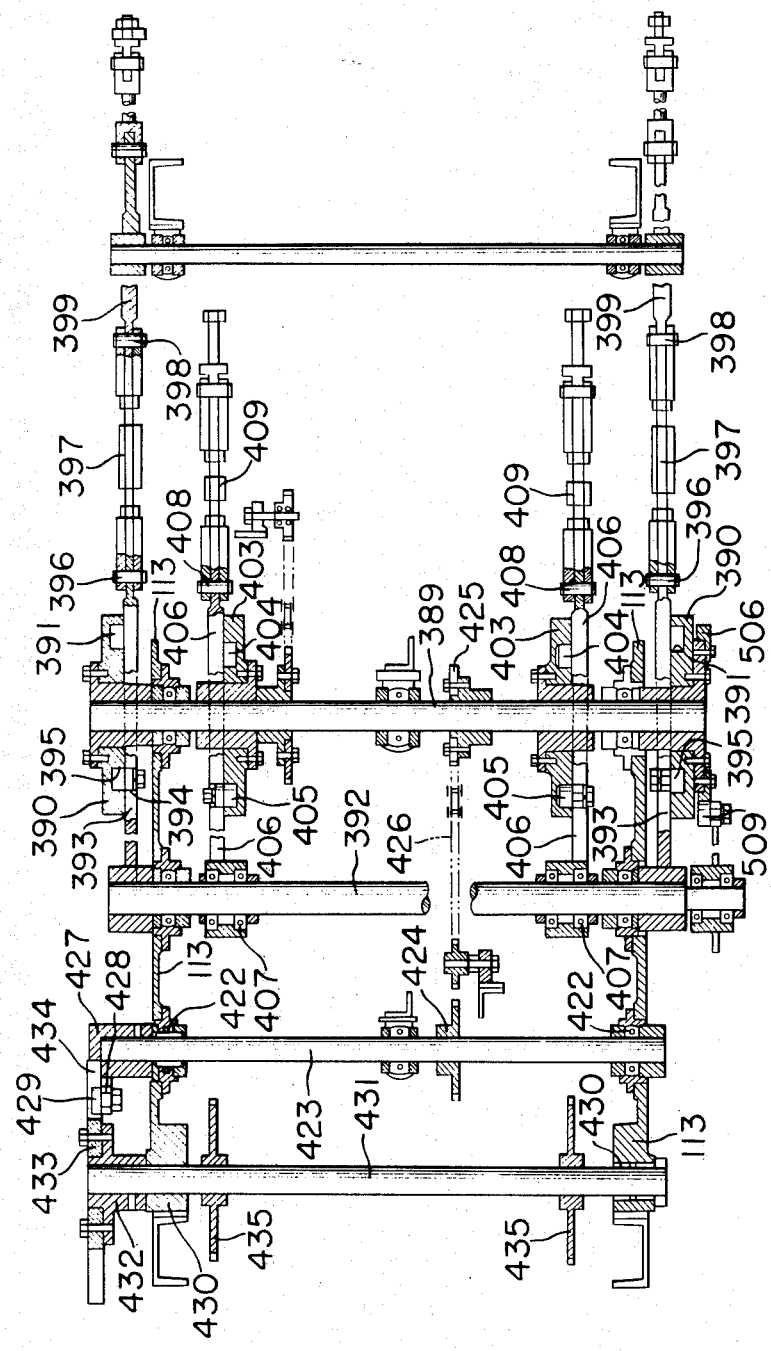
FIG. 33 is a plan view showing the driving mechanism of said fruit slivering mechanism and the fruit pitting mechanism as well as the intermittent driving mechanism of caterpillar belt having cup-shaped receivers.

Referring to the FIGS. 33 and 34, cam bodies 390 are respectively fixed at both outer ends of a rotating shaft 389, and the inside surface of the cam bodies 390 is provided with a cam groove 391. Each base portion of levers 393 is fixed to both outer ends of a rotating shaft 392. A roller 395 is mounted at the central portion of the lever 393 in the lengthwise direction by a pin 394, said roller 395 being fitted into the cam groove 391 of the cam body 390, thereby the lever 393 is swung around the shaft 392 by moving the roller 395 along the cam groove 391 when the rotating shaft 389 and cam body 390 are rotated integrally.

The free end of the levers 393 is connected to the lower end of an adjusting member 397 by a pin 396, and the upper end of the adjusting member 397 is connected to an intermediate portion in a lengthwise direction of a lever 399 by a pin 398.

The base portion of the lever 399 is inserted into a shaft 401 supported by bearings 400 provided at the lower side surface of the frame 113, and free end of the lever 399 is connected to the side face of the vertically movable lower frame 304 by a pin 402 (FIG. 34).

Referring to FIG. 33, cam bodies 403 are fixed on the rotating shaft 389 inside the machine frame 113, each of the cams being provided with a cam groove 404 at the side wall of the cam body 403. There is provided rollers 405 at the middle portion of levers 406 in its lengthwise direction, said rollers being fitted into the cam grooves 404 respectively. The base ends of the levers 406 is rotatably mounted on the shaft 392 which is supported by a bearing 407. The free ends of the levers 406 are connected to the lower ends of length adjusting members 409 respectively by pins 408. The upper ends of the length adjusting members 409 are connected respectively to side wall of the vertically movable upper frame 309 by pins 410. (FIG. 34)

Accordingly, the vertically movable upper frame 309 can make an up and down movement along the guide pole 300 by rotating the rotating shaft 389 through the cam body 390, roller 395, lever 393 and adjusting member 397, and at the same time the vertically movable lower frame 304 can make the up and down movement along the guide pole 300 by rotating the rotating shaft 389 through the cam body 403, roller 405, lever 406 and adjusting member 409. The upper frame 309 and the lower frame 304 are so operated as to approach or separate from each other by the profile of the cam groove of the cam body.

Figure 35:
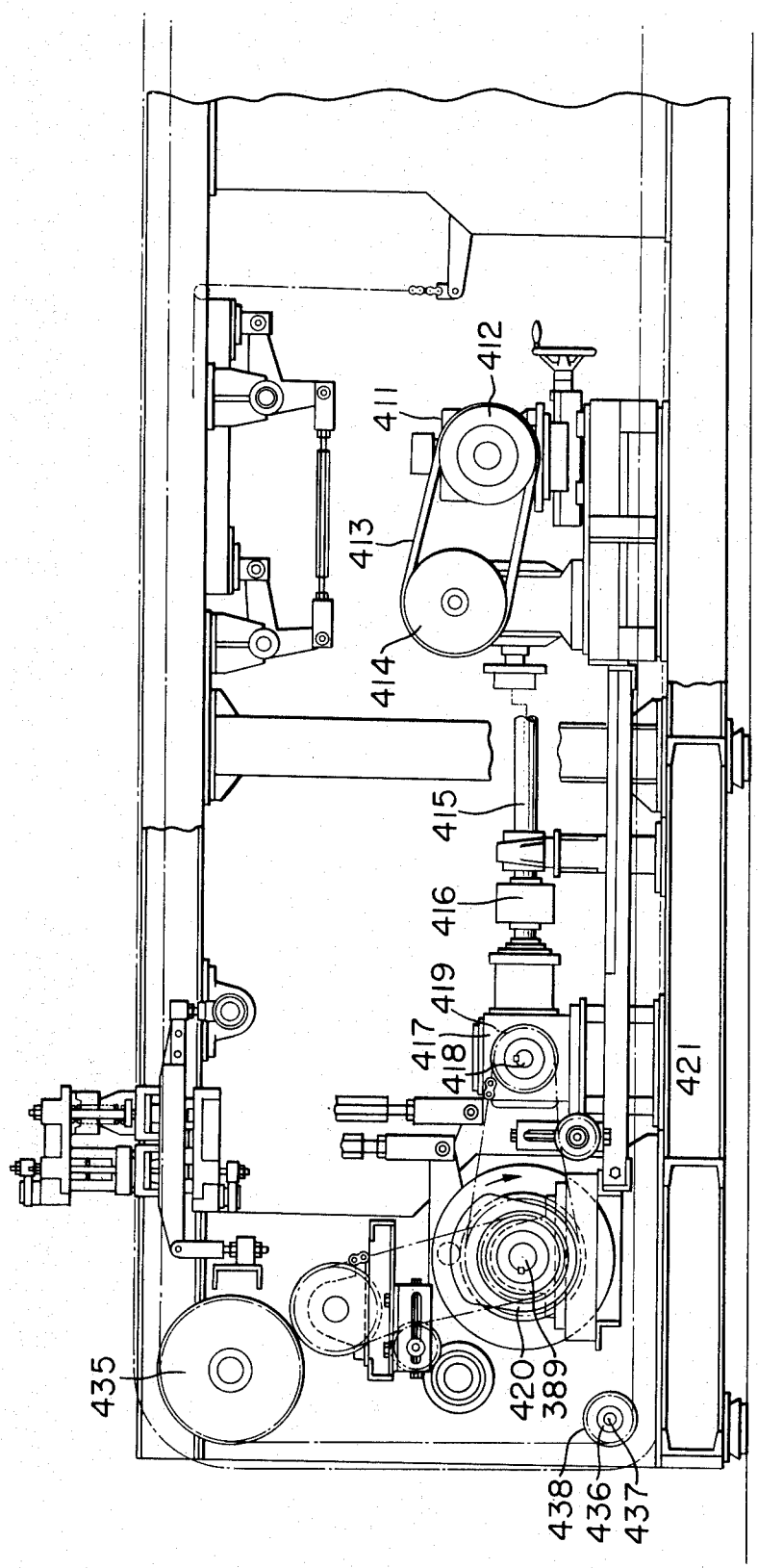
FIG. 35 is a side elevation showing particularly the intermittent driving mechanism of said caterpillar belt by the main motor in the fruit processing apparatus according to the present invention.
Figure 36:
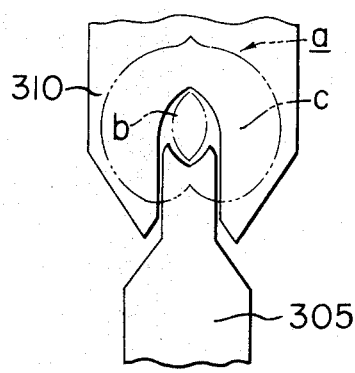
FIG. 36 is a view explaining the state of slivering a fruit by means of the upper cutter and lower cutter in said fruit slivering mechanism.

As shown in FIG. 35, the rotating shaft 389 is rotated by driving the chain 421 through a main motor 411, speed reducer 412, chain 413, direction changer 414, transmission 415, coupling 416, direction changer 417, chain wheel 419 fixed on a shaft 418 of the direction changer 417, and a chain wheel 420.

The driving means of the caterpillar belt 111 having the cup-shaped receivers is constructed as mentioned below.

Referring to FIG. 33, a chain wheel 424 is fixed on a shaft 423 by bearings 422 which is provided on the side wall of the machine frame 113. A chain wheel 425 fixed on the rotating shaft 389 and the chain wheel 424 are connected by a chain 426. An arm 427 is fixed on the outer end of the shaft 423. A roller 429 is mounted on the top end of the arm 427 by a pin 428. A Geneva gear 433 is fixed on the outer end of a shaft 431 by a mounting member 432, said shaft 431 being supported by bearings 430 provided on the machine frame 113. A roller 429 provided on the arm 427 is inserted into the groove 434 of the Geneva gear 433, said roller being disposed so as to come into the groove portion 434 freely. Large chain wheels 435 are fixed on both ends of the shaft 431, respectively, and small chains 438 are fixed on a rotating shaft 437 at the position corresponding to the large chain wheels 435, said rotating shaft 437 being supported by bearings 436 disposed at the lower portion of the machine frame 113. The chains 118 extend around the large chain wheels 435 and the small chain wheels 438, respectively, each of the chains 118 being fixed at the side wall of the caterpillar belt 111 having the cup-shaped receivers and also being extended around the large chain wheels 115 and the small chain wheels 117, as shown in FIG. 15. Accordingly, by rotating the shaft 423, the arm 427 can be rotated together with the roller 428, by which said roller 428 is inserted into the groove portion 434 of the Geneva gear 433 intermittently, and as a result the caterpillar belt 111 is moved intermittently through rotation of the shaft 431.

The operation of the fruit slivering mechanism (D) will be mentioned below.

When the vertically movable upper frame 309 is raised, and synchronously therewith the vertically movable lower frame 304 is descended, the cutter 310 is raised, and at the same time the cam 313 is also raised, and the cam follower 334 of the lever 333 disengages from the cam surface 338, and engages with the cam surface 340. Subsequently, when the cam surface 335 of the cam 312 engages with the cam follower 319 of the lever 317, the lever 317 is rotated thereby in a clockwise direction, and the cam follower 321 moves to the right, whereby the control bar 323 is moved to the right by the end face 324.

By this movement, all of the pawls 356 are released simultaneously from the peripheral grooves 352 of each of the supporting rods 341.

During such operation, the metal 346 engages with the stepped portion 347 of the supporting rod 341, and thereafter the supporting rod 341, that is, the fruit holder 311 suspended by the lower end of the supporting rod 341 is raised together with the cutter 310, and the top portion of the supporting rod 341 protrudes from the vertical hole 343 of the fixed frame 314.

While the fruit holder 311 is raised together with the cutter 310 up to a predetermined position, the cup-shaped receiver in which a new fruit has been introduced advances by one pitch, and reaches directly the fruit pitting station.

Now, at the same time when the descent of the vertically movable upper frame 309 is started, the ascent of the vertically movable lower frame 304 is started.

The movable upper frame 309 goes down together with the upper cutter 310 and the supporting rod 341 whose stepped portion 347 has been engaged with the metal 346, and also the fruit holder 311 goes down simultaneously by its own weight. Then, the fruit holder 311 engages with the portion of the fruit $a$ placed on the cup shaped receiver 112, and at the same time the upper cutter 310 is put through a fruit $a$. At this time, the lower cutter 305 is put through said fruit $a$ by the lifting of the lower frame 305. As a result of the co-operation of the upper cutter 310 and lower cutter 305, the flesh $c$ of the fruit $a$ is slivered, but the pit $b$ of the fruit $a$ remains uncut.

If the upper cutter 310 or lower cutter 305 should hit against the pit $b$, the upper cutter 310 is moved upwardly by the safety and absorbing device of the upper cutter 310, thereby the upper cutter 310 and lower cutter 305 are prevented from being damaged.

During this time, since the cam 312 has also been lowered, it leaves from the cam follower 319, so that the force acting on the control bar 323 is released.

Just before the termination of the slivering operation, the cam follower 334 of the lever 333 is pushed by the cam surface 338 of the cam 313, and since the cam follower 331 pushes the control lever 323 to the left, the pawls 356 are brought to engage simultaneously with the peripheral grooves 352 of the supporting rods 341, but when the pawls do not engage straightly with the peripheral grooves, they are in contact with the supporting rods 341 while being pulled in a direction of engagement by the tension spring 357, so that by a slight vertical movement of the supporting rods 341 made thereafter, the pawls engage with the peripheral grooves 352 perfectly, and the vertical movement of the supporting rods 341 is restricted.

By this means, as described above, the upper cutter 310 alone is raised at first together with the ascent of the vertically movable upper frame 309, and the fruit holder 311 is raised after a lapse of some period and a release of restrict for the supporting rods 341 is effected by the engagement of the pawls into the peripheral grooves, so that the inconvenience that the fruit is raised being adhered with the upper cutter 310 from the cup shaped receiver 112 is perfectly prevented.

FRUIT PITTING MECHANISM (E)

As shown in FIG. 27, the fruit pitting mechanism (E) includes the vertically movable upper frame 309 and the vertically movable lower frame 304, and which are used in the slivering mechanism (D).

The cam 313 provided on the vertically movable upper frame 309 is used also on the pitting mechanism (E), and the cam 313 cooperating with a cam 520 which has the same shape as the cam 312 of the slivering mechanism (D) serves as a restricting means for the supporting rods suspending the fruit holder arranged around a upper rotary cutter 439 in the pitting mechanism (E).

Also, the fixed frame 314 in the slivering mechanism (D) is used for the pitting mechanism (E), a locking device for the fruit holder 441 of the pitting mechanism (E) is provided on the fixed frame 314, and said locking device is substantially the same as the locking device in the slivering mechanism (D).

Referring to FIG. 32, the upper rotary cutter 439, the lower rotary cutter 440, the fruit holder 441 arranged around said upper cutter 439 and their relative elements are explained.

A hollow shaft 444 is provided on the upper frame 309, said hollow shaft 444 being inserted into a bearing 443 fitted in a vertical hole 442 on the upper frame 309. A rod 447 is provided in an inserting hole 445 of the hollow shaft 444 so as to insert the upper end 446 of the rod 447, and a lower end of a supporting bar 450 which is inserted into a hole 449 of the hollow shaft 444 is screwed in a mounting hole 448 provided on the upper end of the rod 447.

A pinion 452 is mounted on the frusto-conical peripheral surface 451 which is formed at the upper end of the hollow shaft 444 by a mounting hole 453 of the pinion 452. The screw portion of the supporting bar 450 which is protrudes from upper surface of the hollow shaft 444 is screwed with a nut 455 through a washer 454, thereby the supporting bar 450 and the pinion 452 are fixed.

A spring 457 is provided between the inner face of the inserting hole 445 and the outer surface of the supporting bar 450, said spring being placed between an upper stepped face 456 of the inserting hole 445 and the upper surface of the rod 447. A mounting member 459 of the upper rotary cutter 439 is provided on the lower large diameter portion 458 of the rod 447, and the upper rotary cutter 439 is fixed on the mounting member 459.

In case the upper rotary cutter 439 is not actuated, a pair of inserting plates 461 each having a opposing face 460 which have the same shape along the outline of the upper rotary cutter 439 are fixed on a mounting member 462 of the upper frame 309 by a screw 463.

A hollow shaft 466 is provided on the lower frame 304, said hollow shaft 466 being inserted into a bearing 465 fitted into a vertical hole 464 on the lower frame 304. The small diameter portion 469 of a rod 468 is inserted into an inserting hole 467 of the hollow shaft 466 and a supporting bar 472 is screwed into a screw hole 470 provided in the small diameter portion 469 of the rod 468. A pinion 474 is mounted on the frusto-conical peripheral surface 473 which is formed at the lower end of the hollow shaft 466 by a mounting hole 475 the pinion 474. On the threaded portion of the supporting bar 472 which protrudes from the lower surface of the hollow shaft 466 is screwed a nut 477 through a washer 476, thereby the supporting bar 472 and the pinion 474 are fixed. The rotary cutter 479 is mounted on a mounting member 478 provided on the rod 468.

A pair of inserting plates 484 are provided on the mounting portion 480 of the lower frame 304 by screws 485, and the inserting plates 484 have opposing surfaces 481 which have the same shape as the outline of the lower rotary cutter 479, and the outer surfaces 482 of the inserting plates 484 are made to be inserted into the opposing parallel surfaces 483 of the inserting plates 461 which are arranged around the upper rotary cutter 439.

When the upper rotary cutter 439 is impacted by any load, the spring 457 is urged, and the small diameter portion 446 of the rod 447 is advanced into a hole 445 in the hollow shaft 444, thereby the impact force is absorbed.

Figure 37:
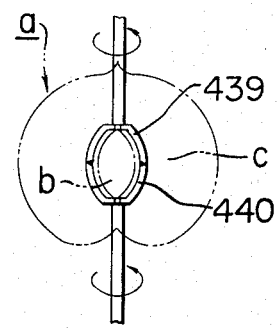
FIG. 37 is a view explaining the state of pitting a fruit by means of the upper rotary cutter and lower rotary cutter in said fruit pitting mechanism.
Figure 38:
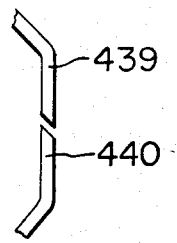
FIG. 38 is a view explaining the edge portions of said upper and lower rotary cutters.

The upper rotary cutter 439 and the lower rotary cutter 440 are formed as shown in FIG. 37 and 38.

The upper rotary cutter 439 and the lower rotary cutter 440 are formed in shapes approximately half circles corresponding to a pit of fruit a, and when both of the cutters 439 and 440 are drawn closely, they form a substantially vertical circle surrounding the pit. Both of the tip portions of the upper and lower rotary cutters are machined to form oblique surfaces with each other, so that they will not produce gap therebetween. The upper and lower pitting cutters 439, 440 are inserted vertically into the cut portions of the flesh from upper and lower direction, and when the cutters are rotated instantaneously, they sever around the periphery of the pit b.

The rotating mechanism for each of the upper rotary cutter 439 and the lower rotary cutter 440 is constituted as follows:

In the rotating mechanism of the upper cutter 439, as shown in FIGS. 28 and 32, a rack member 487 is provided which is freely movable horizontally along a guide member 486 provided on the upper frame 309. The rack portion 488 of the rack member 487 is engaged with said pinion 452, and the hollow shaft 444 is rotated by the horizontal reciprocating motion of the rack member through the pinion 452, whereby the rod 447 and the upper cutter 439 are rotated.

In the rotating mechanism of the lower cutter 440, as shown in FIG. 32, a rack member 490 is provided which is freely movable horizontally along a guide member 489 provided on the lower frame 304, the rack portion 491 of the rack member 490 is engaged with said pinion 474, and the hollow shaft 466 is rotated by the horizontal reciprocating motion of the rack member 490 through the pinion 474, whereby the rod 469 and the lower cutter 479 are rotated.

Figure 39:
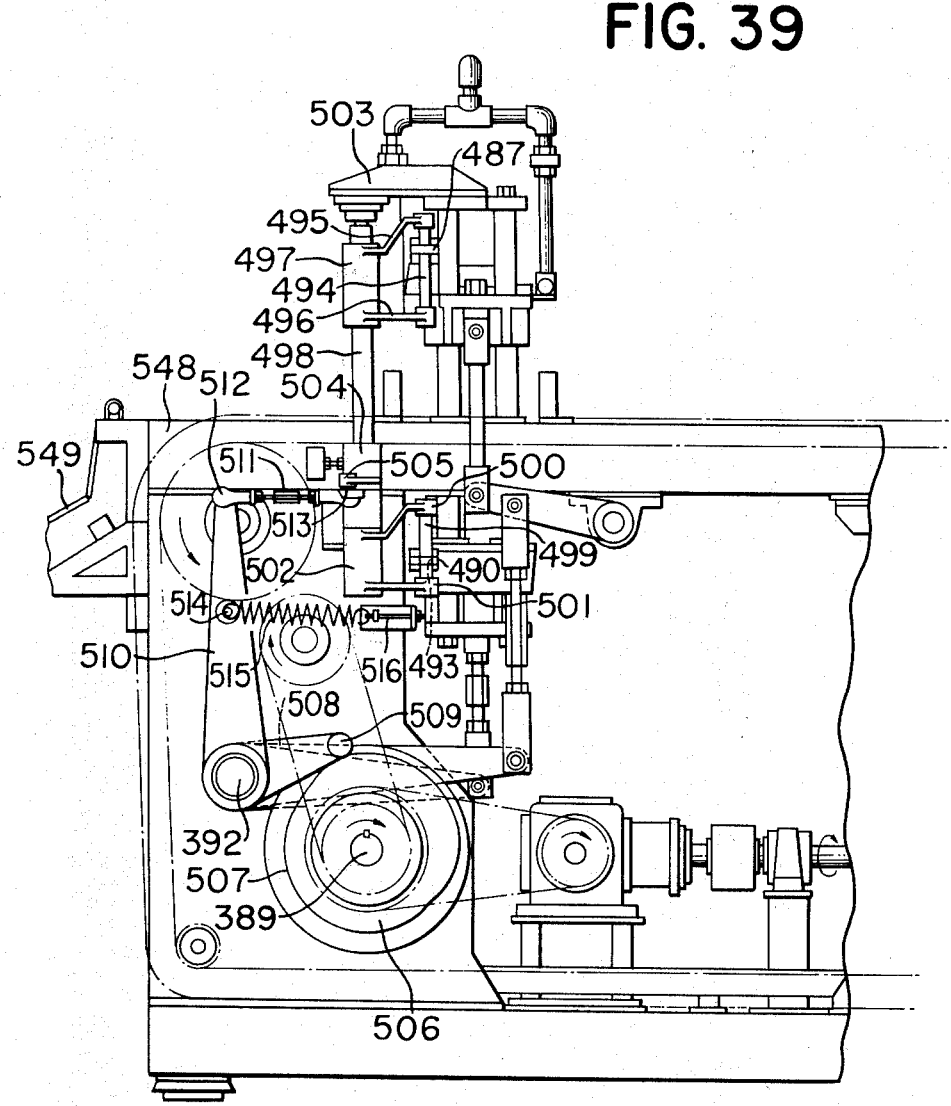
FIG. 39 is a side elevation showing the operating mechanism for rotating the upper and lower rotary cutters in said fruit pitting mechanism.

The driving mechanisms of the rack members 487, 490 are shown in FIGS. 28 and 39. Each of the rack members 487, 490 has a square holes 492, 493, respectively. The upper and lower ends of the bar member 494 passed through the square hole 492 are supported by upper and lower projecting members 495, 496, and a holding member 497 is fixed on a vertical shaft 498. The upper and lower ends of the bar member 499 passed through the square hole 493 are supported by upper and lower projecting members 500, 501, and a holding member 502 is fixed on said vertical shaft 498.

The vertical shaft 498 is rotatably supported on the machine frame 503. A cylindrical member 504 is fixed on the vertical shaft 498, and a projecting member 505 is provided on the periphery of the cylindrical member 504.

A follower 509 is engaged on the cam surface 507 of a cam plate 506 fixed on the outer end of the rotating shaft 389. The follower 509 is mounted on the end of the lever 510, the base end of which is pivoted on the shaft 392.

The lower end of the lever 510 and the base end of the lever 508 are secured on the shaft 392. The left hand end of an operating rod 511 is connected to the upper end of the lever 510 with a universal joint 512, and the right hand end of the operating rod is pivoted on said projecting member 505 with a pin 513.

A spring 515 is provided on the lever 510 at about the center thereof, and the one end of the spring 515 is fixed on a shaft 514. The other end of the spring 515 is fixed on an ajusting piece 516 fixed on the machine frame 113.

Accordingly, when the rotating shaft 389 is rotated, the vertical bar 498 is rotated through the cam plate 506, lever 508, lever 510, and the operating member 511. Upon rotation of the vertical bar 498, the inserting bars 494, 499 are swung through the holding members 497, 502, whereby it is possible to move the rack members 487, 490 simultaneously in a horizontal direction through the square holes 492, 493.

By the horizontal movement of the rack members 487, 490, the upper cutter 439 and the lower cutter 440 are rotated simultaneously through the pinions 452, 474.

The fruit holder 441 is so actuated as to lift with a slight time lag after the lifting of the upper cutter 439 in the same manner as the actuation of the upper cutter 310 in the slivering mechanism (D).

As shown in FIG. 27, the fruit holder 441 in the pitting mechanism (E) has a cup shape, and has a cut groove 517 into which the inserting plate 461 can be inserted, said fruit holder 441 also having a downwardly inclined peripheral surface 518. The posture of the fruit is maintained during the pitting period by engaging the downwardly inclined peripheral surface 518 of fruit holder 441 with the shoulder portion of the fruit.

The fruit holder 441 is suspended by two supporting rods 519. The constitution and actuation of the supporting rod 519 is the same as the constitution and the actuation of the supporting rod 341 of the fruit holder 311 in the severing mechanism (D).

Referring to the FIG. 30, a cam 520 is provided at the left end of the frame 309, and is located at the opposite side of the cam 312 on the upper frame 309. Said cam 520 has the same shape as the shape of the cam 312. This cam 520 serves to control the supporting rods 519 which suspend the fruit holder 441 of the pitting mechanism (E).

To control the fruit holder 441 of the pitting mechanism (E), the actuating means for restricting the supporting rods 519 is provided on the fixed frame 314.

The lower end of a lever 523 is pivoted on a shaft 522 provided with a supporting piece 521 which is provided on the fixed frame 314. A cam follower 525 is pivoted on the upper portion and at the left side of the lever 523 by a pin 524, and a cam follower 527 is pivoted at the top portion of the lever 523 by a pin 526.

A control bar 529 is provided at the upper surface of the fixed frame 314, said control bar 323 being freely movable horizonally in the right and left direction on the fixed frame 314 through sliding and supporting members 528 mounted on the frame 314. The cam follower 527 is positioned to be engaged with the end face 530 of the control bar 529. When the lever 523 is engaged with a pin mounted on the fixed frame 314, said lever 523 can not rotate in the counterclockwise direction.

A supporting member 531 is provided at the right end on the surface of the fixed frame 314. A cam follower 533 is provided on the outer end of the shaft 328 supported by a bearing 532 mounted at the top portion of the supporting member 531, said shaft 328 being swung by the lever 333 through the cam follower 334, lever 333 and cam 313 in the slivering mechanism (D).

Said follower 533 is formed engageable with the right end face 534 of the control bar 529.

As shown in FIG. 29, the supporting rods 519 supporting the fruit holder 441, which is disposed around the upper rotary cutter 439, has a upper large diameter portion 535 and a lower small diameter portion 537. Said upper large diameter portion 535 is inserted into a vertical holes 536 formed in the fixed frame 314, and said lower small diameter portion 537 is inserted into a vertical holes 538 formed in the vertically movable upper frame 309. Metals 539 provided around the vertical holes 538 are formed engageable with the stepped portion 540 formed by the difference between the large diameter portion 535 and the small diameter portion 537.

The fruit holder 441 is suspended by the lower ends of the supporting rods 519 through a mounting member 541, said fruit holder 441 has an inverted cup shape and has a vertical central hole 542 into which the upper rotary cutter 439 can be inserted, cut grooves 517 into which the inserting plate 461 can be inserted, and a downwardly inclined peripheral surface 518. Said surface 518 can be abutted to the shoulder portion of the fruit a in the cup shaped receiver 112 and can maintain the posture of the fruit a when the fruit a is pitted by the upper cutter 439 and the lower cutter 440.

Figure 40:
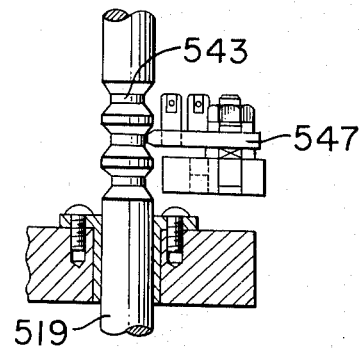
FIG. 40 is a sectional view as viewed on the line XXXX—XXXX in FIG. 30.

Referring to FIG. 40, a number of peripheral grooves 543 are formed at the upper end portion of the supporting rods 519. The upper end of these supporting rods 519 are passed through holes 545 of brackets 544 projectingly provided from the fixed frame 314.

Referring to FIG. 30, pawls 547, which are rotatable horizontally with pins 546 as the center, are secured on the upper surface of the control bar 529, and each of the pawls 547 on each of these pins are urged to rotate in a direction to engage with the peripheral grooves 543 of the supporting rods 519, respectively, by means of tension springs 548, but the pawls 547 are restricted of their rotation not to exceed over the normal engaging position by the stopper pins 549.

A plurality of sets, in this example, 6 sets, of said fruit holder 441 and upper cutters 439 are provided in response to the number of simultaneous processing determined for the pitting mechanism (E).

The related elements of the upper cutter 439 and fruit holder 441 are formed on the the vertically movable upper frame 309 and the fixed frame 314.

The driving means for the vertically movable upper frame 309 is mentioned above.

Also, the intermittent driving means for the caterpiller belt 111 having a number of the cup shaped receiver 112 is mentioned above.

The operation of the pitting mechanism (E) will be mentioned below.

When the vertically movable upper frame 309 is raised, and synchronously therewith the vertically movable lower frame 304 is lowered, the cutter 439 is raised, and at the same time the cam 313 also is raised, and the cam follower 334 of the lever 333 disengages from the cam surface 338, and engages with the cam surface 340. When the cam surface 525 of the cam 520 engages with the cam follower 525 of the lever 523, the lever 523 is rotated thereby in the clockwise direction, and the cam follower 527 moves to the right, whereby the control bar 529 is moved to the right by the end face.

By this movement, all of the pawls 547 are released simultaneously from the peripheral grooves 543 of each of the supporting rods 519.

During such operation, the metal 539 engages with the stepped portion 540 of the supporting rod 519, and thereafter the supporting rod 519, that is, the fruit holder 441 suspended by the lower end of the supporting rod 519 is raised together with the upper cutter 439, and the top portion of the supporting rod 519 protrudes from the vertical hole 536 of the fixed frame 314.

While the fruit holder 441 is raised together with the cutter 439 up to a predetermined position, the cup shaped receiver in which a new fruit has been introduced advances by one pitch.

Now, at the same when the descent of the vertically movable upper frame 309 is started, the ascent of the vertically movable lower frame 304 is started.

The movable upper frame 309 goes down together with the upper cutter 439 and the supporting rod 519 whose stepped portion 540 has been engaged with the metal 539, and also the fruit holder 441 goes down simultaneously by its own weight. Then, the fruit holder 441 engages with the portion of the fruit a placed on the cup shaped receiver 112, and at the same time the upper cutter 439 is put through the fruit a, simultaneously the inserting plate 461 and the upper cutter 439 are inserted into the slivering clearance. In this time, the lower cutter 440 is put through said fruit a by a lifting of the lower frame 304.

As shown in FIGS. 37 and 39, soon after the upper cutter 439 and the lower cutter 440 draw near mutually under the state that tip portions of both cutters are obliquely abutted, the vertical bar 498 rotates with a predetermined angle, so that the upper holding member 497 and the lower holding member 502 are swung by said vertical bar 498 and at the same time the upper rack member 487 and the lower rack member 490 are pulled through the inserting bars 494, 499.

As shown in FIG. 32, the pinions 452, 474 are rotated by the upper rack member 487 and the lower rack member 490 responsive to each pinion, and at the same time the upper rotary cutter 439 and the lower rotary cutter 440 are rotated through the hollow shafts 447, 468 responsive to each rotary cutter. Thus, the flesh and pit of the fruit can be severed at the boundary between them by the upper rotary cutter 439 and the lower rotary cutter 440. In this case, any annular strip of flesh is never left in the severed flesh for the reason that the tip portions of both upper and lower cutters are obliquely abutted.

As a result of the co-operation of the upper rotary cutter 439 and lower rotary cutter 440, the boundary area between the flesh c and the pit b is severed.

If the upper cutter 439 or lower cutter 440 should hit against to the pit b, the upper cutter 439 is moved upwardly by the safety and absorbing device of the upper cutter 439, thereby the upper cutter 439 and lower cutter 440 are prevented from damage.

During this time, since the cam 520 has also been lowered, it leaves from the cam follower 525, so that the force acting on the control bar 529 is lost.

Just before the termination of the pitting operation, the cam follower 334 of the lever 333 is pushed by the cam surface 338 of the cam 313, and since the cam follower 533 pushes the control lever 529 to the left, the pawls 547 are brought to engage simultaneously with the peripheral grooves 543 of the supporting rods 519, but when the pawls do not engage straightly with the peripheral grooves, they are in contact with the supporting rods 519 while being pulled in a direction of engagement by the tension spring 548, so that by a slight vertical movement of the supporting rods 519 made thereafter, the pawls engage with the peripheral grooves 543 perfectly, and the vertical movement of the supporting rods 519 is restricted.

By this measure, as described above, the upper rotary cutter 439 alone is raised at first together with the ascent of the vertically movable upper frame 309, and the fruit holder 441 is raised after a lapse of some period and a release of restrict for the supporting rods 519 is effected by the engagement of the pawls into the peripheral grooves, so that the inconvenience that the fruit is raised being adhered to the upper cutter 439 from the cup shaped receiver 112 is perfectly prevented.

After the severing operation, the upper rack member 487 and the lower rack member 490 are pushed and restored to the original state, and at the same time both cutters 439, 440 are also restored to the original state by the reverse rotation.

The fruit which has been slivered and which has been severed between the flesh c and the pit b is transferred in the state that it is placed on the receiver 112, and then thrown out from said receiver 112 on the turning end 548 of the caterpillar belt 111 into a chute 549, through which the fruit is supplied to the following mechanism which is the flesh-pit separating and recovering mechanism (F).

FLESH-PIT SEPARATING AND RECOVERING MECHANISM (F)

The fruits a which have been formed with cut portion between the flesh c and the pit b are passed from a chute 549 to the flesh-pit separating and recovering mechanism (F).

Figure 41:
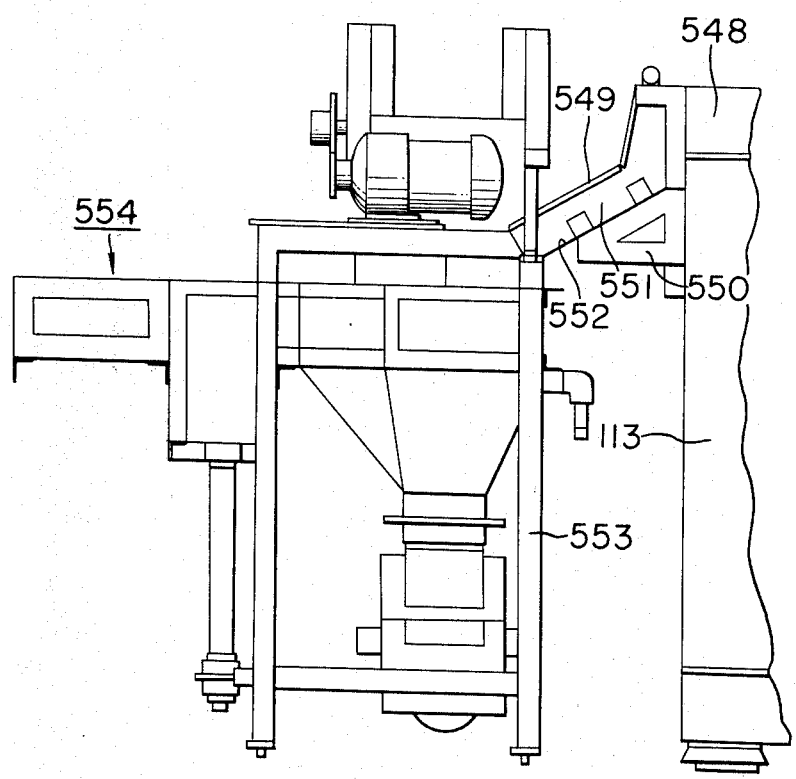
FIG. 41 is a side elevation showing the flesh-pit separating and recovering mechanism in the fruit processing apparatus according to the present invention.
Figure 42:
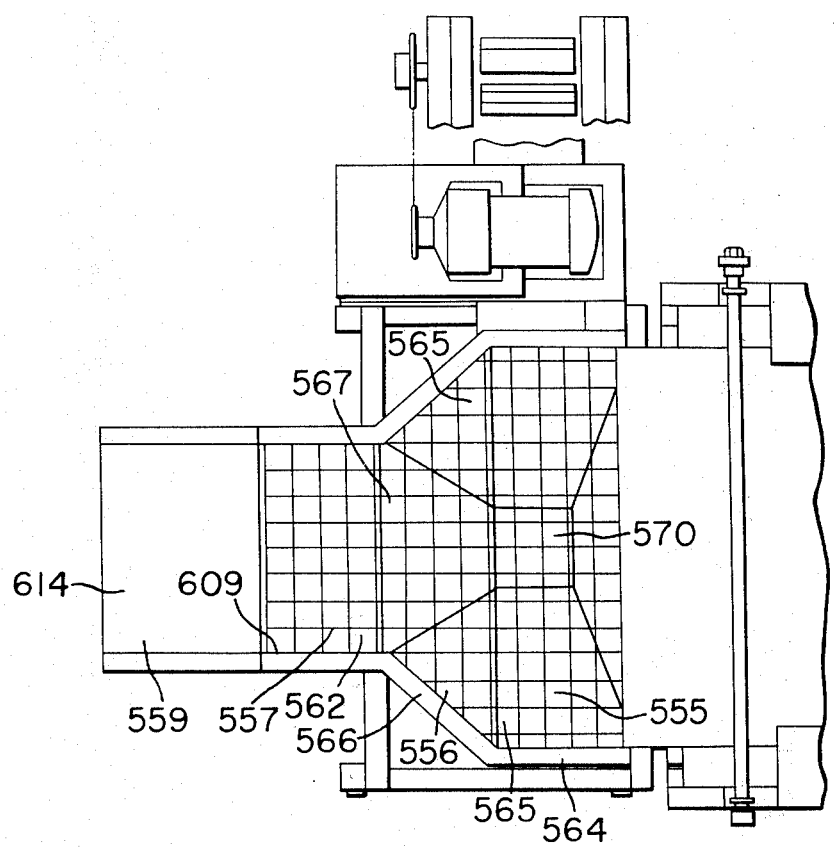
FIG. 42 is a plan view of said flesh pit separating and recovering mechanism.

As shown in FIGS. 41 - 42, the chute 549 is fixed at its both side portions to a mounting portion 550 provided at the left side end of the machine frame 113. The bottom surface 552 between the side walls 551, 551 is inclined downwardly to the left, the height of the top side portion being so determined that the fruits a in the receivers 112 are discharged into the chute 549 without receiving a dropping shock at the direction converting portion 548 at the left end of the caterpillar belt for receivers 111.

The water tank 554 mounted on the supporting member 553 is arranged to receive the fruits a delivered from the chute 549. The dropping end of the chute 549 is provided near above the right side end of the water tank 554.

The water tank 554 comprises, as seen in its plan view, in the order from right to left, the first section 555 for separating the flesh and the pits, the second section 557 having a narrow width following the narrowed portion 556, the width of which being gradually reduced beginning from the width at the both sides of said first section 555, and the third section 559 having a curved and raised bottom portion 558 continuing the second section 557. Each of the bottom portions 560, 561 of the first section 555 and the second section 557 are perforated, and the size of the holes 562 are so dimensioned that they do not allow the dropping of the flesh c but allow the dropping of pits b.

The bottom portions 560, 561 are conveniently formed by any suitable material such as metal netting, grid or the like.

Figure 43:
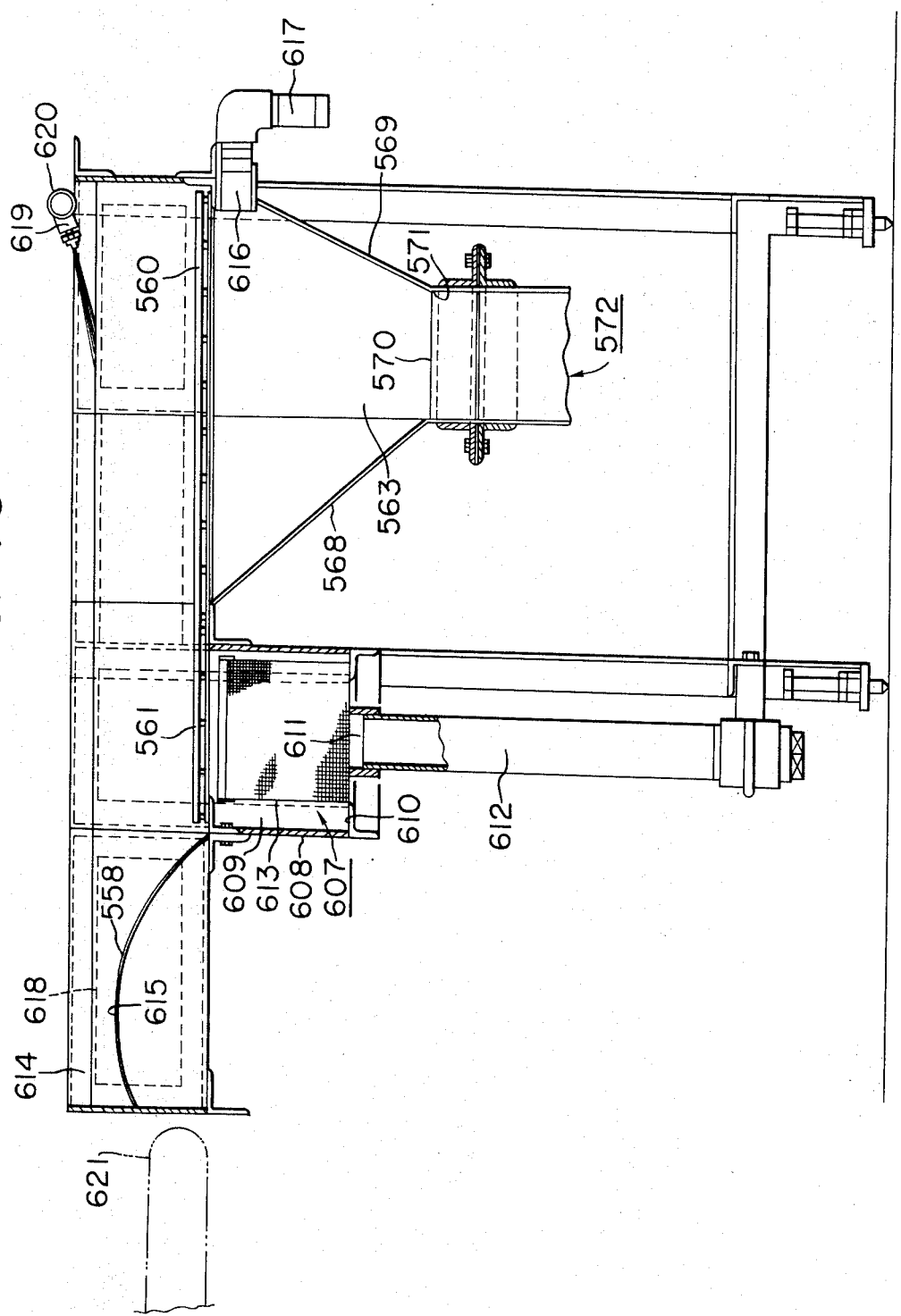
FIG. 43 is an enlarged sectional view of said flesh-pit separating and recovering mechanism.

As shown in FIG. 43, a pit recovering portion 563 in a form of a hopper is provided below the perforated bottom portion of the first section 555.

The pit recovering portion 563 has a shape of a hopper comprising lateral inclined portions 565, the upper sides thereof being fixed on the lower edges of the side walls 564 of the first section 555, narrowed inclined portion 567, the upper sides of which being fixed on the lower edges of the side walls 566 of the narrowed portion 556, front-end inclined portion 568 and the rear end inclined portion 569. A pit take out mechanism 572 is connectedly provided at the opening edge 571 of the dropping port 570 of the pit recovering portion 563.

As shown in FIG. 44, an electric motor 575 is mounted at the supporting portion 574 fixed at the upper end of the leg portion 573 of the support member 553. An introducing port 578 fixed at the lower end of the conveyor case 577 fixed with the upper mounting portion 576 at the supporting portion 574, is connected to the lower opening edge 580 of a connecting curved cylinder 579. The upper opening edge 582 of the connecting curved cylinder 579 is connected to the opening edge 571 of said dropping port 570 by means of a fixing member 583, whereby the pit recovering portion 572 is communicated with the inside of the conveyer case 577, and at the same time the conveyer case 577 is disposed obliquely with its introducing port 578 directed downwardly.

A chain wheel 586 is fixed on a shaft 585 supported by a bearing 584 below the conveyer case 577. A supporting member 589 is provided, the lower portion of which is fixed on the upper end of the conveyer case 577 by means of a bolt 588 such that said support member 589 projects from the upper end opening 587 of the conveyer case 577. A sliding guide plate 590 for a bearing is fixed on the support member 589. A bearing 592 is fitted on the opposed guide portions 591 of said guide plate 590. One end of an adjusting rod 594 is fixed to a mounting portion 593 of the adjusting rod of the bearing 592, and the threaded portion 595 at the other end of said adjusting rod 594 is screwed into and projects from the threaded hole 597 of a holding portion 596 secured on the outer surface of a rear plate of the conveyer case 577.

Accordingly by moving the adjusting rod 594 forwardly and backwardly, it is possible to transfer the bearing 592.

A shaft 598 is mounted in the bearing 592, and a chain wheel 599 is fixed on the shaft 598. A chain 601 is passed over the chain wheel 599 and a chain wheel 600.

Another chain wheel 602 fixed on the shaft 598 has the same size and the same number of teeth as the chain wheel 586 provided on the lower end of the conveyer case 577, and a chain 603 is passed around these chain wheels 602 and 586.

Base portions 605 of a large number of buckets 604 are fixed on the chain 603, an opening 606 of each of the buckets 604 being oriented in the advancing direction of the upper side chain 603.

Each of the buckets 604 are secured closely on the chain 603 such that there is almost no gap therebetween.

The bottom portion 561 at the second section 557 of the water tank 554 is also perforated, and a basket-shaped pit recovering portion 607 is provided continuous to the lower portion of the bottom 561.

As shown in FIGS. 42 and 43, the pit recovering portion 607 is formed by securing the upper edges of the wall portions 608 on the lower edge at the first and last ends of the second section 557, securing the upper edges of the wall portions 609 on the lower edges of the right and left side of the walls, and by providing a bottom portion 610 by securing the four peripheral portion thereof on the lower edges of these wall portions 608, 609. A draining port 611 is provided on this bottom portion 610. The upper end of a draining pipe 612 is fixed on the draining port 611, and the end portion of the draining pipe 612 is disposed at a suitable portion.

A basket 613 made of a metal netting is placed at the bottom portion 610 in the pit recovering portion 610. The basket 613 is so adapted that it can be taken out upwardly after lifting the bottom portion 561 of the second section 557.

The third section 559 following the second section 557 has a curved and raised bottom portion 558, the base portion 558 thereof is curved and raised to form the highest portion 615 at slightly inward of the overflow port 614 at the left end of the water tank 554 as shown in FIG. 43, the portion near the boundary with the second section 557 has the same level as that of the bottom portions 560 of the water tank 554, and the level of the portion of the overflow port 614 at the left side end is made somewhat lower than the highest portion 615.

Thus, in the third section 559, the bottom becomes deeper gradually towards the second section 557, then becomes shallower rather suddenly, after which the bottom increases its depth to some extent.

A feed water port 616 is provided above the rear wall 569 of the hopper-shaped flesh recovering portion 563. A feed water pipe 617 is connected to this feed port 616, and water is caused to flow into the hopper-shaped flesh recovering portion 563 from the feeding port 616 through the feed water pipe 617 supplied from a suitable water source so as to introduce the water into the first section 555, the second section 557 and the third section 559 of the water tank 554. By this feeding, the water level 618 is maintained in the water tank 554, and the water extends all over the hopper-shaped pit recovering portion 563, pit take out conveyer case 577, and the basket shaped pit recovering portion 607. Thus, by controlling te drainage of water from the draining pipe 612, and by causing water to flow out of the overflow port 614 at the left side end of the water tank 554, a water stream is obtained from the first section 555 to the third section 559.

In the first section 555 of the water tank 554, water injecting nozzles 619 are disposed below the chute 549. These nozzles 619 are provided in a large number at equal spacing on the feed water pipe 620 traversing above the first section 555, and are adapted to inject in the water stream in the first section 555.

The flesh-pit separating and recovering mechanism (F) operates as follows;

As for the separation of the flesh c and the pits b thrown into the first section 555 of the water tank 554 through chute 549, the flesh c which has a small specific gravity floats on the water, and the pits b which have a large specific gravity sink down into the water. Since the water in the water tank 554 flows from the first section 555 towards the third section 559, the pits b drops down through holes 562 formed in the bottom portion 560 into the pit recovering portion 563, but the flesh c is transferred gradually by the water stream.

In this case, the transfer of the flesh c, which is floating near the water surface and moving by the injected water from the injection nozzle 619, is promoted, and the flesh c takes a posture in which the side where the pit has been severed is oriented upwardly.

The flesh c is further transferred to the second section 557 by the water stream where the width of the stream is narrow and the speed is swift, and the pits b which were not dropped into the pit recovering portion 563 through the bottom portion 560 of the first section 555 and carried to the second section 557 drop into the basket 613 through the holes 562 of the bottom portion 561. Thus, all of the pits b drop into the pit recovering portion 563 through the bottom portions 560 and 561 of the water tank 554, or into the basket 613 before they reach to the second section 557.

The flesh c carried from the second section 557 further to the third section 559 passes over the highest portion 615 of the curved and raised bottom 558 together with the water stream, and is transferred conveniently on the conveyer 621 through the overflow port 614.

The water stream in the third section 559 becomes rapid because it passes through the shallow portion formed by the curved and raised bottom 558, so that the flesh c transfers smoothly without staying in the third section 559.

The pits b, which have large a specific gravity and which do not float up, will not pass over the curved and raised bottom 558 even if they were carried by the water stream.

The flesh c, which is taken out after passing over the overflow port 614, will not be bruised at the taking out because it passes over the highest portion 615 of the curved and raised portion 558, with the water as a lubricant.

The pits b dropped into the pit recovering portion 563 through the bottom portion 560 of the first section 555 are transferred from the introducing port 578 into the conveyor case 577 through the connecting cylinder 579. Since there is water in the lower portion of the conveyer case 577, and the level of which is the same as the level of the water tank 554, the pits b, which are carried into the conveyer case 577 through the introducing port 578, are scooped up by each of the buckets 604 which change their direction while they are in water.

The pits b scooped up by the buckets 604 are carried upwardly by the rotation of the bucket conveyer, and at the upper turning point of the bucket conveyer, the pits b in the buckets 604 are discharged downwardly, and are recovered at a suitable place.

The pits b dropped into the baskets 613 through the bottom portion 561 in the second section 557 are thrown away to a suitable place by taking up the basket 613 after lifting the bottom portion 561 in the second section, when it is desired. By draining the water in the second section 557 to a suitable place through a lower drain pipe 612, it is possible to promote the dropping of the pits b into the basket 613 through the bottom portion 561 in the second section 557.

By means of the flesh-pit separating and recovering mechanism (F), the flesh c and the pits b are automatically separated and recovered. Also the flesh is not bruised during the separation and recovering. Furthermore, the pits are removed without mingling with the flesh.

What is claimed is:

1. A fruit treating apparatus for fruits each having an indent therein and a sature line comprising a fruit treating mechanism including a tank having a water level therein for receiving and advancing fruits to be treated in such a manner that the fruits are longitudinally aligned in the water for preventing the fruits from bridging one another, said tank having an inlet end for introducing fruits into the tank and an outlet end for removing fruits from the tank, a lifter at the outlet end of said tank; a connecting mechanism for receiving fruits from said lifter and for smoothly conveying the fruits received from said lifter; a fruit posture control mechanism arranged to receive the fruits from said connecting mechanism and including cup-shaped receivers for receiving the fruits and means cooperating with said cup-shaped receivers for orienting the fruits in such a manner that the indents of the fruits are oriented substantially in the vertically downward direction, said means including a finder gear mechanism which operated only when the fruits are placed thereon and said finder gear driving mechanism including a plurality of finder gears arranged with a phase difference of 90° to each other and disposed in successive order, said finder gear driving mechanism also including a wedge-shaped projection so that the combination of said finder gears and said projection orient the sature line of the fruits in a predetermined direction with said wedge-shaped projection registering with the stem indent of the fruits; fruit slivering mechanism for slivering the posture-control fruits on said receivers including an upper cutter and a lower cutter; a fruit pitting mechanism arrange to receive the fruits from said fruit slivering mechanism for severing each of said fruits slivered and separating the flesh and pit, said fruit pitting mechanism including an upper rotary cutter and a lower rotary cutter; and a flesh-pit separating and recovering mechanism arranged to receive the separated flesh and pits for separating the flesh and pits and for recovering the flesh, said flesh-pit separating and recovering mechanism including means for flowing the flesh along a path of travel while the pits are dropped out of the path of travel.

2. A fruit treating apparatus according to claim 1, wherein the fruits are charged at random into the inlet end of said tank, said fruit feeding mechanism including a bridge preventing portion located within said tank between the inlet and outlet ends thereof and including an intermediate bottom having slits formed therein, movable partition walls extendable upwardly through the slits in said intermediate bottom, a file transfer portion having fixed partition walls located downstream from said movable partition walls within said tank, and said lifter being freely movable in the up and down direction and located downstream from said file transfer portion, said lifter having a number of pockets for receiving fruits therein; said fruit charging portion at the inlet end of said tank having a bottom surface, said file transfer portion having a bottom surface, the bottom surface of said fruit charging portion, the bottom surface of said file transfer portion and the intermediate bottom of said bridge preventing portion being aligned in the same horizontal plane, means providing a stream of water flowing in the tank from the inlet to the outlet ends thereof, the fruits moved by the water stream in said tank being caused to align in longitudinal files by means of said bridge preventing portion and causing the fruits to transfer to the passages formed between said fixed partition walls of said file transfer portion, and the fruits located in the foremost row in said file transfer portion being taken up by said pockets in said lifter.

3. A fruit treating apparatus according to claim 1, wherein said fruit feeding mechanism comprises a fruit charging portion at the inlet end of said tank into which the fruits are thrown at random, a bridge preventing portion located in said tank downstream from said fruit charging portion and including an intermediate bottom having slits formed therein extending in the direction between the inlet and outlet ends of said tank and movable partition walls arranged to be moved upwardly and downwardly through said slits, a file transfer portion located downstream from said bridge preventing portion and having laterally spaced fixed partition walls therein extending in the direction between the inlet and outlet ends of said tank, and a subsided portion located downstream from said file transfer portion and adjacent the outlet end of said tank, said lifter provided in said subsided portion, said lifter having a number of pockets therein each having a fruit receiving face and ladder portions and bent portions forming the fruit receiving face; said fruit charging portion having a horizontal bottom surface, said file transfer portion having a horizontal bottom surface, the bottom surface of said fruit charging portion, the bottom surface of said file transfer portion and the intermediate bottom of said bridge preventing portion being located in the same horizontal plane, said lifter being vertically movable in said subsided portion, the bottom of said subsided portion being positioned below the adjacent bottom surface of said file transfer portion, and the fruit receiving face of each of the pockets in said lifter being located at least below the bottom surface of said file transfer portion when said lifter is in its lowermost position, the fruits moved by the water stream in said tank being caused to align in longitudinal files by means of said bridge preventing portion and the fruits transferred by the water stream into said bridge preventing portion being filed by said movable partition walls extending upwardly through said slits in said intermediate bottom, and the water stream causing the fruits to transfer into the parallel passages formed between said fixed partition walls of said filing transfer portion, and the foremost row of the fruits in said filing transfer portion being received by said lifter.

4. A fully automatic fruit treating apparatus comprising a fruit feeding mechanism including a tank having a water level therein and said tank having an inlet end and an outlet end, a fruit charging portion located within said tank adjacent the inlet end thereof, a bridge preventing portion located within said tank adjacent to the downstream end of said fruit charging portion, a file transfer portion located within said tank and located adjacent to the downstream end of said bridge preventing portion, and a subsided portion located between the downstream end of said file transfer portion and the outlet from said tank and including a vertical lifter positioned therein; a connecting mechanism located adjacent the outlet from said tank for receiving fruits therefrom and including individual chambers for temporarily receiving the fruits transferred from said fruit feeding mechanism, each of said chambers comprising a door and a pusher and said pusher capable of penetrating freely through the lower portion of said chambers, a posture control mechanism arranged to receive fruits from said connecting mechanism and including cup-shaped receivers for supporting the fruits and a stem indent finding mechanism for locating the stem indent portions of the fruits in a vertically downward position in said receivers; a fruit slivering mechanism associated with said posture control mechanism and including an upper cutter and a lower cutter for slivering the fruits into two halves leaving the pit portion in the fruit oriented in said cup-shaped receiver, means for moving said cup-shaped receivers through said fruit slivering mechanism; a pitting mechanism arranged adjacent said fruit slivering mechanism and in association with said posture control mechanism and including an upper rotary cutter and a lower rotary cutter for severing between the flesh and the pit of the fruits which have been slivered by means of said slivering mechanism as said cup-shaped receivers are advanced; and a flesh-pit separating and recovering mechanism including a water tank for receiving the flesh and pits separated in said pitting mechanism, said water tank having a perforated bottom, pit recovering means operatively associated with said perforated bottom, and said water tank having a section thereof with a curved and raised bottom and an overflow port and means for flowing water through said tank for forwarding the flesh over said curved and raised bottom.

5. A fully automatic fruit treating apparatus comprising a fruit feeding mechanism including a tank having a water level therein and having an inlet at one end thereof and an outlet at the other end thereof, a fruit charging portion located within said tank at the inlet end thereof, a bridge preventing portion located within said tank downstream from and adjacent said fruit charging portions, a file transfer portion located within said tank adjacent to and downstream of said bridge preventing portion, and a subsided portion located adjacent and between said file transfer portion and the outlet end of said tank, a vertical lifter located within said subsided portion; a connecting mechanism including individual chambers for receiving fruits from the outlet end of said tank in said fruit feeding mechanism, each individual chamber provided with a door and a pusher for freely penetrating through a lower portion of each said chamber, a posture control mechanism for the fruit located adjacent said connecting mechanism and including caterpillar belt extending from said connecting mechanism, cup-shaped receivers formed on said caterpillar belt, and stem indent finding mechanisms associated with said cup-shaped receivers for locating the stem indent portion of the fruits in said receivers in a vertically downwardly directed position; a sature line registering mechanism located in said posture control mechanism for positioning the sature line of the fruits in said receivers, a fruit slivering mechanism operatively associated with said cup-shaped receivers and located downstream from said sature line registering mechanism and including an upper cutter and a lower cutter for slivering the fruits in said receivers in two halves while leaving the pit portion therein; a pitting mechanism located adjacent to and downstream from said fruit slivering mechanism and associated with said cup-shaped receivers, said pitting mechanism including an upper rotary cutter and a lower rotary cutter for severing between the flesh and the pit of the fruits which have been slivered in said fruit slivering mechanism; and a flesh-pit separating and recovering mechanism located adjacent and downstream from said pitting mechanism and including a water tank for receiving the fruits discharged from said cup-shaped receivers and which have been separated into the flesh and the pit of said fruits; said water tank having a perforated bottom, pit recovering means associated with the perforated bottom of said tank, said tank including a section having a raised curved bottom and an overflow port for separating the flesh from the pits and for forwarding the flesh to an end portion thereof.

* * * * *